United States Patent [19]
Wood et al.

[11] Patent Number: 5,776,842
[45] Date of Patent: Jul. 7, 1998

[54] CELLULOSIC WEB WITH A CONTAMINANT BARRIER OR TRAP

[75] Inventors: Willard E. Wood, Arden Hills; Neil J. Beaverson, Hugo, both of Minn.

[73] Assignee: Cellresin Technologies, LLC, Minneapolis, Minn.

[21] Appl. No.: 603,337

[22] Filed: Feb. 20, 1996

Related U.S. Application Data

[63] Continuation-in-part of Ser. No. 264,771, Jun. 23, 1994, Pat. No. 5,492,947.

[51] Int. Cl.$^6$ .................................................. B32B 27/00
[52] U.S. Cl. .................................................. 442/394
[58] Field of Search .................................................. 442/394

[56] References Cited

U.S. PATENT DOCUMENTS

| | | | |
|---|---|---|---|
| 655,661 | 8/1900 | Reenstierna. | |
| 2,389,168 | 11/1945 | Snyder | 137/21 |
| 2,412,148 | 12/1946 | Hershberger | 154/43.5 |
| 2,715,085 | 8/1955 | Boger | 154/43.5 |

(List continued on next page.)

FOREIGN PATENT DOCUMENTS

| | | |
|---|---|---|
| 0 454 910 | 11/1991 | European Pat. Off. . |
| 483380A1 | 5/1992 | European Pat. Off. . |
| 0 626 256 | 11/1994 | European Pat. Off. . |
| 1441752 | 5/1966 | France . |
| 91-6849 | 6/1991 | France . |
| 2677366 | 12/1992 | France . |
| 2927733 | 1/1980 | Germany . |
| 3710569 | 5/1988 | Germany . |
| 195 20 989 A | 12/1996 | Germany . |
| 50-64144 | 5/1975 | Japan . |
| 54-142282 | 11/1979 | Japan . |
| 57-205515 | 12/1982 | Japan . |
| 59-156531 | 7/1984 | Japan . |
| 59-260004 | 12/1984 | Japan . |
| 61-103542 | 5/1986 | Japan . |
| 61-106348 | 5/1986 | Japan . |
| 62-27162 | 2/1987 | Japan . |
| 62-98608 | 4/1987 | Japan . |
| 62-269030 | 10/1987 | Japan . |
| 62-263047 | 11/1987 | Japan . |
| 63-87925 | 4/1988 | Japan . |
| 63-218063 | 9/1988 | Japan . |
| 63-237932 | 10/1988 | Japan . |
| 63-265926 | 11/1988 | Japan . |
| 1-16618 | 1/1989 | Japan . |
| 1-167496 | 6/1989 | Japan . |
| 2-18702 | 1/1990 | Japan . |
| 2-18703 | 1/1990 | Japan . |
| 2-18704 | 1/1990 | Japan . |
| 2-18705 | 1/1990 | Japan . |
| 2-18706 | 1/1990 | Japan . |
| 2-254844 | 9/1990 | Japan . |
| 3-100065 | 4/1991 | Japan . |
| 3-133163 | 6/1991 | Japan . |
| 4-108523 | 4/1992 | Japan . |
| 4-132556 | 5/1992 | Japan . |
| 4-362141 | 12/1992 | Japan . |
| 6-181728 | 7/1994 | Japan . |
| 7-35168 | 4/1995 | Japan . |
| 91-JP667 | 5/1991 | WIPO . |
| 91-JP1012 | 7/1991 | WIPO . |
| 95 12484 | 5/1995 | WIPO . |
| WO 96 00260 A | 1/1996 | WIPO . |

OTHER PUBLICATIONS

Database WPI, Section CH, Week 9123, Derwent Publications Ltd., London, GB; Class A18, AN 91–167598 XP002033643 & JP 03 100 065 A (Toppan Printing Co. Ltd.), 25 Apr. 1991.

Database WPI, Section CH, Week 8842, Derwent Publications Ltd., London, GB; XP002033905 & JP 63 218 063A (Chikayku Shoten KK), 12 Sep. 1988.

"Injection Blow–Molding and Stretch–Blow Molding", *Modern Plastics Encyclopedia*, vol. 61, No. 10A (1984) pp. 192–194.

"Separation and Identification of Poly(ethylene Terephthalate) Oligomers by Gel Permeation Chromatography", *Journal of Polymer Science: Polymer Chemistry Edition*, vol. 17, pp. 4123–4127 (1979).

"Supercritical Fluid Extraction and Chromatography for the Determination of Oligomers in Poly(ethylene terephthalate) Films", Bartle et al., *Anal. Chem.*, vol. 63, pp. 2371–2377 (1991).

"Determination of Poly(ethylene terephthalate) Oligomers in Refrigeration Oils by Adsorption Column Chromatography–Gel Permeation Chromatography", Kshiono, *Anal. Chem.*, vol. 51, pp. 2398–2400 (Dec. 1979).

Patent Abstracts of Japan, vol. 15, No. 493 (M–1191), 13 Dec. 1991 & JP 03 215031 A (Kyoraku Co. Ltd.), 20 Sep. 1991. (See Abstract) & Database WPI Week 9144, Derwent Publications Ltd., London, GB (See Abstract).

"Formation of ultrathin films consisting of proteins or polysaccharides and syndiotactic–rich poly(vinyl alcohol) mixtures adsorbed at air–solution interface." K. Yamaura et al., *Colloid Polym. Sci.*, 268(10), 968–71. (Abstract).

(List continued on next page.)

*Primary Examiner*—Peter A. Szekely
*Attorney, Agent, or Firm*—Merchant, Gould, Smith, Edell, Welter & Schmidt, P.A.

[57] ABSTRACT

Nonwoven cellulosic fiber webs such as, for example, paperboards and corrugated paper boards are described containing a barrier layer that can act both as a barrier to the passage of contaminants and as a trap for contaminant materials that can arise in new materials or from the recycle of fiber in the manufacture of paperboard. The effective material which acts as a trap or barrier is a cyclodextrin compound, substantially free of an inclusion complex compound. The cyclodextrin barrier layer can be corrugated or sheet laminated with or on the cellulosic web. Alternatively, the cyclodextrin material can be included in a coating composition that is coated on the surface or both surfaces of the cellulosic web after web formation. Further, the cyclodextrin material can be included in a thermoplastic film that can be used as one layer in a bilayer or multilayer laminate containing a cellulosic web.

40 Claims, 1 Drawing Sheet

U.S. PATENT DOCUMENTS

| | | | |
|---|---|---|---|
| 2,802,763 | 8/1957 | Freedlander | 154/43.5 |
| 2,860,801 | 11/1958 | Nielsen | 215/1 |
| 2,973,293 | 2/1961 | Schofield | 154/43.5 |
| 3,129,014 | 4/1964 | Hutchison et al. | 280/5 |
| 3,472,835 | 10/1969 | Buckler et al. | 536/46 |
| 3,526,572 | 9/1970 | Finelli | 161/183 |
| 3,536,260 | 10/1970 | Volz | 239/6 |
| 3,616,010 | 10/1971 | Dunholter et al. | 156/210 |
| 3,616,189 | 10/1971 | Harr | 161/190 |
| 3,687,087 | 8/1972 | Yurkoski et al. | 105/355 |
| 3,733,309 | 5/1973 | Wyeth et al. | 260/75 |
| 3,740,258 | 6/1973 | Walles | 117/94 |
| 3,802,984 | 4/1974 | Brugh, Jr. et al. | 156/184 |
| 3,886,017 | 5/1975 | Brugh, Jr. et al. | 156/184 |
| 3,904,104 | 9/1975 | Kane | 229/3.5 |
| 3,958,056 | 5/1976 | Brugh, Jr. et al. | 428/215 |
| 3,972,467 | 8/1976 | Whillock et al. | 229/14 |
| 4,048,361 | 9/1977 | Valyi | 428/35 |
| 4,108,324 | 8/1978 | Krishnakumar et al. | 215/1 |
| 4,127,633 | 11/1978 | Addleman | 264/97 |
| 4,131,141 | 12/1978 | Weissenbach | 141/285 |
| 4,223,128 | 9/1980 | Halek et al. | 528/481 |
| 4,258,082 | 3/1981 | Horne | 427/160 |
| 4,274,985 | 6/1981 | Szejtli et al. | 525/54.2 |
| 4,303,755 | 12/1981 | Yukuta et al. | 521/52 |
| 4,318,489 | 3/1982 | Snyder et al. | 215/1 |
| 4,334,627 | 6/1982 | Krishnakumar et al. | 215/1 |
| 4,342,398 | 8/1982 | Chang | 215/1 |
| 4,356,115 | 10/1982 | Shibanai et al. | 252/522 |
| 4,357,468 | 11/1982 | Szejtli et al. | 536/56 |
| 4,368,825 | 1/1983 | Motill | 4/1 |
| 4,370,368 | 1/1983 | Hirata et al. | 428/35 |
| 4,371,574 | 2/1983 | Shefford | 428/35 |
| 4,374,878 | 2/1983 | Jakobsen et al. | 428/35 |
| 4,376,089 | 3/1983 | Bogner et al. | 264/109 |
| 4,381,277 | 4/1983 | Nilsson | 264/512 |
| 4,385,089 | 5/1983 | Bonnebat et al. | 428/35 |
| 4,393,106 | 7/1983 | Maruhashi et al. | 428/35 |
| 4,434,021 | 2/1984 | Robinson et al. | 156/242 |
| 4,459,400 | 7/1984 | Kuhfuss et al. | 528/289 |
| 4,463,121 | 7/1984 | Gartland et al. | 524/291 |
| 4,473,515 | 9/1984 | Ryder | 264/28 |
| 4,482,586 | 11/1984 | Smith et al. | 428/35 |
| 4,486,378 | 12/1984 | Hirata et al. | 264/512 |
| 4,525,396 | 6/1985 | Takasa et al. | 428/35 |
| 4,547,572 | 10/1985 | Fenyvesi et al. | 536/103 |
| 4,568,574 | 2/1986 | Allen | 427/383.1 |
| 4,598,741 | 7/1986 | Johnson et al. | 141/5 |
| 4,615,914 | 10/1986 | Walles | 427/237 |
| 4,636,343 | 1/1987 | Shibanai | 264/118 |
| 4,677,177 | 6/1987 | Shibanai et al. | 527/300 |
| 4,681,934 | 7/1987 | Shibanai et al. | 536/46 |
| 4,698,246 | 10/1987 | Gibbons et al. | 428/35 |
| 4,711,936 | 12/1987 | Shibanai et al. | 525/485 |
| 4,719,135 | 1/1988 | Gerdes et al. | 428/35 |
| 4,722,815 | 2/1988 | Shibanai | 264/117 |
| 4,725,633 | 2/1988 | Shibanai | 523/220 |
| 4,725,657 | 2/1988 | Shibanai | 523/210 |
| 4,726,905 | 2/1988 | Friedman et al. | 210/692 |
| 4,727,064 | 2/1988 | Pitha | 514/58 |
| 4,728,510 | 3/1988 | Shibanai et al. | 424/94.5 |
| 4,732,759 | 3/1988 | Shibanai et al. | 424/94.61 |
| 4,738,923 | 4/1988 | Ammeraal | 435/97 |
| 4,769,242 | 9/1988 | Shibanai | 424/411 |
| 4,772,291 | 9/1988 | Shibanai et al. | 8/526 |
| 4,774,329 | 9/1988 | Friedman | 536/103 |
| 4,780,257 | 10/1988 | Beck | 264/40.1 |
| 4,781,977 | 11/1988 | Yagi et al. | 428/332 |
| 4,795,665 | 1/1989 | Lancaster et al. | 428/34.2 |
| 4,808,232 | 2/1989 | Beesley | 127/46.3 |
| 4,840,679 | 6/1989 | Ammeraal et al. | 127/40 |
| 4,847,151 | 7/1989 | Shibanai | 428/389 |
| 4,850,494 | 7/1989 | Howard, Jr. | 215/1 |
| 4,851,394 | 7/1989 | Kubodera | 514/54 |
| 4,871,541 | 10/1989 | Shibanai | 424/411 |
| 4,877,774 | 10/1989 | Pitha et al. | 514/26 |
| 4,877,778 | 10/1989 | Carpenter et al. | 514/58 |
| 4,894,267 | 1/1990 | Bettle et al. | 428/36.7 |
| 4,902,788 | 2/1990 | Zemel et al. | 536/1.1 |
| 4,904,306 | 2/1990 | Ammeraal | 127/46.1 |
| 4,904,307 | 2/1990 | Ammeraal | 127/63 |
| 4,906,488 | 3/1990 | Pera | 426/573 |
| 4,915,301 | 4/1990 | Munteanu | 239/45 |
| 4,917,956 | 4/1990 | Rohrbach | 428/423.1 |
| 4,920,214 | 4/1990 | Friedman | 536/103 |
| 4,925,684 | 5/1990 | Simon | 426/107 |
| 4,931,524 | 6/1990 | Sato et al. | 527/301 |
| 4,938,998 | 7/1990 | Stock | 427/223 |
| 4,956,210 | 9/1990 | Hoyt et al. | 428/35.3 |
| 4,965,104 | 10/1990 | Barton et al. | 428/34.1 |
| 4,977,004 | 12/1990 | Bettle, III et al. | 428/36.7 |
| 4,977,936 | 12/1990 | Thompson et al. | 141/312 |
| 5,001,176 | 3/1991 | Nakazima | 524/48 |
| 5,006,377 | 4/1991 | Delcorps et al. | 428/34.7 |
| 5,007,966 | 4/1991 | Hedges et al. | 127/34 |
| 5,007,967 | 4/1991 | Ammeraal | 127/46.1 |
| 5,032,182 | 7/1991 | Ammeraal et al. | 127/63 |
| 5,041,227 | 8/1991 | van Eikeren et al. | 210/640 |
| 5,063,251 | 11/1991 | Bergishagen | 521/84.1 |
| 5,079,088 | 1/1992 | McGroarty et al. | 428/331 |
| 5,080,795 | 1/1992 | Pirkle et al. | 210/643 |
| 5,096,893 | 3/1992 | Pitha et al. | 514/58 |
| 5,098,793 | 3/1992 | Rohrbach et al. | 428/532 |
| 5,100,878 | 3/1992 | Geber | 514/58 |
| 5,102,699 | 4/1992 | Beeson et al. | 427/379 |
| 5,120,720 | 6/1992 | Pitha et al. | 514/58 |
| 5,122,399 | 6/1992 | Farrell et al. | 428/34.2 |
| 5,129,544 | 7/1992 | Jacobson et al. | 220/562 |
| 5,139,687 | 8/1992 | Brogher et al. | 252/8.6 |
| 5,142,035 | 8/1992 | Lewis | 536/103 |
| 5,147,480 | 9/1992 | Lang | 156/64 |
| 5,153,061 | 10/1992 | Cavagna et al. | 428/325 |
| 5,173,481 | 12/1992 | Pitha et al. | 514/58 |
| 5,177,129 | 1/1993 | Bobo, Jr. | 524/48 |
| 5,178,946 | 1/1993 | Sato et al. | 428/412 |
| 5,180,190 | 1/1993 | Kersey et al. | 280/838 |
| 5,183,706 | 2/1993 | Bekele | 428/349 |
| 5,183,809 | 2/1993 | Weisz et al. | 514/58 |
| 5,198,429 | 3/1993 | Konig et al. | 514/58 |
| 5,202,188 | 4/1993 | Bekele | 428/414 |
| 5,208,083 | 5/1993 | Freed | 428/36.7 |
| 5,208,316 | 5/1993 | Yoshinaga | 528/68 |
| 5,213,808 | 5/1993 | Bar-Shalom et al. | 424/473 |
| 5,221,669 | 6/1993 | Anand et al. | 514/58 |
| 5,223,311 | 6/1993 | Tsutsumi et al. | 427/388.1 |
| 5,223,346 | 6/1993 | Lu | 428/516 |
| 5,230,935 | 7/1993 | Delimoy et al. | 428/36.7 |
| 5,232,767 | 8/1993 | Hisazumi et al. | 428/213 |
| 5,234,383 | 8/1993 | Lang | 156/470 |
| 5,241,059 | 8/1993 | Yoshinaga | 536/4.1 |
| 5,242,701 | 9/1993 | Poole | 426/407 |
| 5,244,615 | 9/1993 | Hobbs | 264/83 |
| 5,246,611 | 9/1993 | Trinh | 252/8.6 |
| 5,247,013 | 9/1993 | Shinoda et al. | 525/54.2 |
| 5,252,384 | 10/1993 | Bothe et al. | 428/212 |
| 5,254,258 | 10/1993 | Pirkle et al. | 210/643 |
| 5,254,394 | 10/1993 | Bothe et al. | 428/212 |
| 5,256,491 | 10/1993 | Ishida et al. | 428/500 |
| 5,258,414 | 11/1993 | Bergishagen | 521/84.1 |
| 5,262,444 | 11/1993 | Rusincovitch et al. | 521/50.5 |
| 5,266,387 | 11/1993 | Fujii et al. | 428/213 |
| 5,266,413 | 11/1993 | Mills et al. | 428/480 |

| | | | |
|---|---|---|---|
| 5,269,935 | 12/1993 | Clough et al. | 210/653 |
| 5,314,733 | 5/1994 | Saito et al. | 428/36.6 |
| 5,330,565 | 7/1994 | Saitoh et al. | 106/20 R |
| 5,330,808 | 7/1994 | Duff et al. | 428/35.7 |
| 5,335,373 | 8/1994 | Kangman | 2/161.7 |
| 5,336,762 | 8/1994 | Ranney | 534/16 |
| 5,350,788 | 9/1994 | Visioli et al. | 524/251 |
| 5,352,717 | 10/1994 | Bergishagen | 524/48 |
| 5,354,424 | 10/1994 | Rha et al. | 162/135 |
| 5,378,414 | 1/1995 | Derkach | 264/22 |
| 5,378,421 | 1/1995 | Salame | 264/230 |
| 5,384,172 | 1/1995 | Takado et al. | 428/35.7 |
| 5,398,729 | 3/1995 | Spurgat | 138/133 |
| 5,405,567 | 4/1995 | Needham et al. | 264/322 |
| 5,505,969 | 4/1996 | Wood et al. | 426/130 |

OTHER PUBLICATIONS

"Data on Plastic Packaging Materials for Food," H. Sugawara (Akita Prefectural Fermentation Research Institute), *Konbatekku*, Apr. 1994, pp. 1–7. (Translation).

"Synthesis of Chemically Modified Cyclodextrins," Alan P. Croft et al., Tetrahedron Report Number 147, Department of Chemistry, Texas Tech University, Lubbock, TX 79409, U.S.A. (Oct. 4, 1982), pp. 1417–1474.

"Application of cyclodextrin to insecticides, fungicides and aromatic films," I. Shibanai et al., *Gosei Jushi*, 34(4), pp. 2–9. (Abstract).

"Dispersion of β–cyclodextrin inclusion compound in polyethylene and manufacture of its blown films," D. Xu et al., *Gaofenzi Cailiao Kexue Yu Gongcheng*, 7(6), pp. 39–43. (Abstract).

"β–Cyclodextrin Matrix Films for Colon–Specific Drug Delivery," v. Siefke et al., *Proceed. Intern. Symp. Control. Rel. Bioact. Mater.*, 20 (1993), Controlled Release Society, Inc., pp. 182–184.

"Use of CDs in Plastics & Paper," *Cyclodextrin News*, vol. 3, No. 7 (Mar. 1989).

"Practical Application of Cyclodextrine to the Production of Insecticide, Mold Control and Fragrant Plastic Films," I. Shibanai et al., Japan Liquid Crystal. Co., Ltd.

"Polymer Inclusion Compounds by Polymerization of Monomers in β–Cyclodextrin Matrix in DMF Solution," M. Maciejewski et al., *J. Macromol. Sci.–Chem.*, A13 (1), pp. 87–109 (1979).

"The thin film of fluroine–containing polymer having cyclodextrin prepared by Langmuir–Blodgett technique," M. Tamura et al., *Chem. Lett.*, (7), 1313–16. (Abstract).

"Surface–active properties of β–lactoglobulin: adsorption and rearrangement of glycosylated derivatives in surface films," Ralph D. Waniska et al., *J. Colloid Interface Sci.*, 117(1), pp. 251–257. (Abstract).

"Preparation and properties of insoluble films of cyclodextrin condensation polymers," W. Kutner et al., *J. Inclusion Phenom. Mol. Recognit. Chem.*, 13 (3), pp. 257–265.

"Basic Concepts of Permeation Processes," *Recent Developments in Separation Science*, pp. 107–155.

"Permeability Coefficients," H. Yasuda et al., pp. 229–240.

"Permeation, Diffusion, and Sorption of Gases and Vapors," R. M. Felder et al., *Methods of Experimental Physics*, vol. 16c, Copyright 1980 by Academic Press, Inc.

"Chapter 1 The Simple Transport Laws," *Diffusion and Sorption Fibers and Films*, pp. 3–11.

"Chapter 14 Convective Diffusion to a Solid Surface," *Diffusion and Sorption in Fibers and Films*, pp. 172–192.

"Fundamentals of gas permeation," D. L. MacLean et al., *Hydrocarbon Processing*, Aug. 1983.

"Solubility of Gases in Polyethylene," A. S. Michaels et al., *Journal of Polymer Science*, vol. L, pp. 393–412 (1961).

"Sorption and Flow of Gases in Polyethylene," A. S. Michaels et al., *Journal of Polymer Science*, vol. XLI, pp. 53–71 (1959).

"Analysis of Transient Sorption and Permeation of Small Molecules in Multiphase Polymer Systems," J. M. Ottino et al., *Polymer Engineering and Sciences*, vol. 24, No. 2, p. 153–161 (1984).

"Mechanical Properties and Permeability of Polypropylene and Poly(ethylene terephthalate) Mixtures," P. Bataille et al., *Polymer Engineering and Science*, vol. 27, No. 9, (1987).

"Permeation of Pure Gases under Pressure through Asymmetric Porous Membranes. Membrane Characterization and Prediction of Performance," R. Rangarajan et al., *Ind. Eng. Chem. Process Des. Dev.*, vol. 23, No. 1 (1984), pp. 79–87.

"Integrated Forms of Simple Rate Expressions," pp. 17–19. *Polymer Handbook*, J. Brandrup et al. Interscience Publishers.

"Trends in Barrier Design," *Packaging*, May 1991, pp. 30–38.

"Barrier Packaging Technologies—What are the Alternatives?", Ronald H. Foster, Session 5 Design for Plastics Packaging.

"Minimizing Plastic Package/Product Interactions—An Unfilled Need," John D. Culter, *Journal of Plastic Film & Sheeting*, vol. 8, Jul. 1992, pp. 208–226.

"Interaction Between Packaging Materials and Foods," Chaim H. Mannheim et al., *Packaging Technology and Science*, vol. 3, pp. 127–132 (1990).

"Packaging for Flavour Retention and Protection from Odours," W. Guise, *Packaging*, Aug. 1992, pp. 9–13.

"The Odour Barrier Performance of Packaging Films," M.G.R. Zobel, *Packaging*, Dec. 1986, pp. 22–25.

"Barrier Media," J. Rellmann et al., *Kunststoffe German Plastics*, 82 (1992), pp. 3–9.

"Recycled Polymers in Food Packaging: Migration Considerations," Timothy H. Begley et al., *Food Technology*, Nov. 1993, pp. 109–112.

"Migration of plasticizers from printing inks into foods," Laurence Castle et al., *Food Additives and Contaminants*, vol. 6, No. 4 (1989).

"Method for Evaluating Package—Related Flavors," Lisa J. Thompson et al., *Food Technology*, Jan. 1994, pp. 90–94.

"Off–flavours' in foods, a summary of experience: 1948–74," N. Goldenberg et al., *Chemistry and Industry*, 5 Jul. 1975, pp. 551–557.

"Organoleptic and Migrational Properties of PP Films Produced with Various Amounts of Scrap," F. Lox et al., *Packaging Technology and Science*, vol. 5, pp. 307–312 (1992).

"Nylon Film in Food Packaging," *Paper, Film & Foil Converter*, p. 62.

"Optimizing the Value and Benefits of Packaging Films," R. Marsili, *Food Product Design*, Nov. 1993, pp. 63–75.

"Materials," *Modern Plastics International*, Jul. 1992, p. 50.

"Chapter 1 An Overview of Food and Food Packaging Interactions," Joseph H. Hotchkiss, *American Chemical Society*, 1988, pp. 1–10.

"Chapter 2 Transport of Apple Aromas in Polymer Films," P. T. DeLassus et al., *American Chemical Society*, 1988, pp. 11–27.

"Chapter 4 Permeation of High–Barrier Films by Ethyl Esters," J. Landois–Garza et al., *American Chemical Society*, 1988.

"Cyclodextrin Inclusion Compounds in Research and Industry," Wolfram Saenger, *Angew. Chem. Int. Ed. Engl.*, 19, pp. 344–362, 1980.

"Points to Consider for the Use of Recycled Plastics in Food Packaging: Chemistry Considerations," Chemistry Review Branch, U.S. Food & Drug Administration, Washington, D.C., pp. 1–9, May, 1992.

Barrier Polymers, Kirk–Othmer, Encyclopedia of Chemical Technology, Fourth Edition, vol. 3, pp. 931–962.

Chinodex® Cyclodextrins, Chinoin Pharmaceutical and Chemical Works Ltd. pp. 1–40.

"Odors and taints from papaerboard food packaging", Tice et al., *Tappi Journal* vol. 77, No. 12, pp. 149–154.

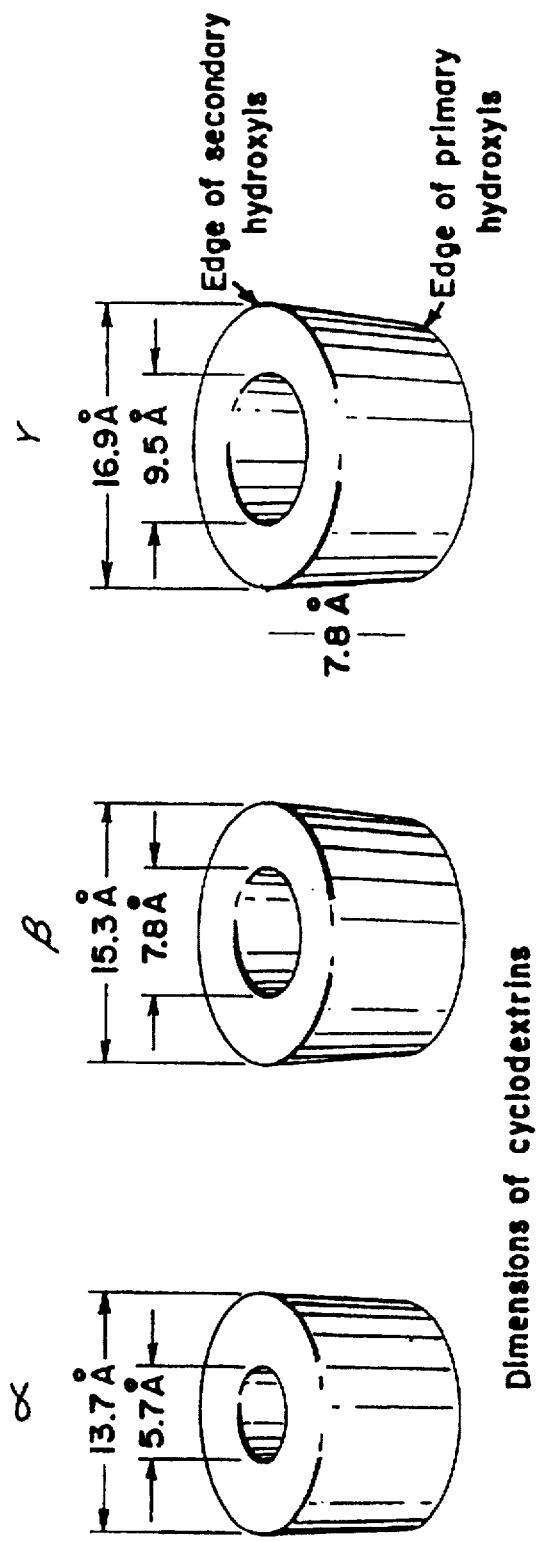

CELLULOSIC WEB WITH A CONTAMINANT BARRIER OR TRAP

CROSS REFERENCE TO RELATED APPLICATIONS

This application is a continuation in part of Wood et al., U.S. application Ser. No. 08/264,771 filed on 23 Jun. 1994, now U.S. Pat. No. 5,492,947.

FIELD OF THE INVENTION

The invention relates to improved rigid or semirigid cellulosic packaging material, including chipboard, boxboard, paperboard or cardboard materials, which have permeant barrier or contaminant trap ring or barrier properties. The preferred barrier paperboard material can prevent the passage of permeant materials from the ambient atmosphere through the paperboard into packaging contents. Further, any mobile or volatile, organic contaminant material from the environment, present within the paperboard, derived either from a source of cellulosic material, a printing chemical, a coating chemical or from any contaminant in intentionally recycled material, can be trapped by the active barrier materials within the paperboard.

The invention has a variety of aspects including a barrier laminate structure comprising at least one layer of a cellulosic material with at least one layer of a barrier or a barrier polymer film layer containing an active barrier component. A next aspect of the invention comprises a food or edible, comestible material packaged within the cellulosic packaging material having the permeant or contaminate barrier or trap. Further aspects of the invention comprise methods of packaging materials in a cellulosic web having a contaminate or permeant barrier or trap to protect the food item from inappropriate flavors, aromas or odors.

BACKGROUND OF THE INVENTION

Cellulosic materials such as a paperboard, a boxboard, a cardboard or a chipboard consists of relatively thick, compared with paper, sheet materials that are comprised of bonded, small discrete fibers comprising cellulose. Such fibers are typically held together by secondary bonds that, most probably, are hydrogen bonds. To form a cellulosic sheet, fiber is formed into a rough, web or sheet on a fine screen from a water suspension or dispersion of fiber, combined with fiber additives, pigments, binder material, secondary binder materials or other components. After the sheet is formed on a fine screen, the rough sheet is then dried, calendared and further processed to result in a finished sheet having a controlled thickness, improved surface quality, one or more coating layers, a fixed moisture content, etc. Further, after sheet formation the paperboard can be further coated, embossed, printed or further processed before rolling and distribution. Paperboard, boxboard, chipboard or cardboard typically has a thickness of greater than about 0.25 mm. Typically, paper is considered a sheet-like material having a thickness of less than about 0.25 mm.

Paperboard, boxboard, chipboard and cardboard are made in many types and grades to service a variety of uses. The final finishes of paperboard can be rough or smooth, can be laminated with other materials, but are typically thicker, heavier and less flexible than conventional paper materials. Paperboard can be made both from primary sources of fibers and from secondary or recycled fibrous materials. The fiber used in making paperboard largely comes directly from the forestry industry. However, increasingly paperboard is made from recycled or secondary fiber derived from paper, corrugated paperboard, woven and nonwoven fabric, and similar fibrous cellulosic materials. Such recycled material inherently contains recycled organic material such as inks, solvents, coatings, adhesives, residue from materials the fiber source contacted and other sources of material. These organics can pose some threat of contamination of the contents of containers made from such recycled materials.

The main components used in the manufacture of paper products are mechanical/semi-mechanical wood pulp, unbleached Kraft chemical wood pulp, white chemical wood pulp, waste fiber, secondary fiber, non-wood fibers, recycled woven and non-woven fibers, fillers and pigments. Many varieties of wood pulp are used derived from both hard and softwoods. The chemical properties or composition of paperboard is determined by the types of fibers used and by any non-fiber substances incorporated in or applied on the surface of the paper during paper making or subsequent paper converting operations. Paper properties that are affected directly by the fiber's chemical compositions include color, opacity, strength, permanence, and electrical properties.

In the manufacture of paperboard, barrier coatings are often required to improve resistance to the passage of water, water vapor, oxygen, carbon dioxide, hydrogen sulfide, greases, fats, oils, odors or other miscellaneous chemicals through the paperboard material. Water (liquid) barriers are known and can change the wettability of the paper surface using sizing agents. A grease or oil barrier can be provided by hydrating the cellulosic fibers to form a pinhole free sheet or by coating the paper with a continuous film of a material that is fat or grease resistant (lipophobic). Gas or vapor barriers are formed using a continuous film of a suitable material that can act as a barrier to the specific gas or vapor.

A variety of film materials have been developed as barriers to the passage of water vapor, oxygen or other permeants. Brugh Jr. et al., U.S. Pat. No. 3,802,984, teach moisture barriers comprising a laminate of a cellulosic sheet and a thermoplastic material. Dunn Bolter et al., U.S. Pat. No. 3,616,010, teach a moisture barrier comprising a laminated and corrugated paperboard and a lamination layer of a thermoplastic bag stock. Brugh Jr. et al., U.S. Pat. No. 3,886,017, teach a moisture barrier in a container comprising a laminate of high and low density cellulosic sheets within thermoplastic film. Willock et al., U.S. Pat. No. 3,972,467, teach improved paperboard laminates for containers comprising a laminate of paperboard polymer film and an optional aluminum foil layer. Valyi, U.S. Pat. No. 4,048,361, teaches packaging containing a gas barrier comprising a laminate of plastic cellulosic and other similar materials. Gibens et al., U.S. Pat. No. 4,698,246, teach laminates comprising paperboard polyester and other conventional components. Ticassa et al., U.S. Pat. No. 4,525,396, teach a pressure resistant paper vessel comprising a barrier film laminate having gas barrier properties prepared from paperboard thermoplastic films, paper components and other conventional elements. Cyclodextrin materials and substitute cyclodextrin materials are also known.

Other art related to this application include Pitha et al., United States Patent No. 5,173,481 and "synthesis of chemically modified cyclodextrins," Alan P. Kroft et al., Tetrahedron Reports No. 147; Department of Chemistry, Texas Tech University, Ludwig, Tex., 79409, USA, (Oct. 4, 1982), pp. 1417–1474. Pitha et al. disclose cyclodextrins and substituted cyclodextrins. The major use of cyclodextrin materials is in formation of an inclusion complex for the delivery of an inclusion compound to a use locus. The cyclodextrin material has a hydrophobic interior pore that is ideal for complexing a variety of organic compounds. Unmodified cyclodextrin inclusion complex materials have been used in films, see Japan Patent Application No. 63–237932 and Japanese Patent Application No. 63–218063. The use of cyclodextrin inclusion compounds is discussed in detail in "Cyclodextrin Inclusion Compounds in Research and Industry", *Willfrom Saenger, Angew. Chem. Int. Ed. Enql.*, Vol. 19, pp. 344–362 (1980). The cyclodextrin inclusion compounds are used in a variety of delivery applications. Materials including deodorants, antibacterial materials, antistatic agents, eatable oils, insecticides, fungicides, deliquescent substances, corrosion inhibitors, flavor enhancing compounds, pyrethroids, pharmaceutical and agricultural compounds, etc. can be delivered. Such applications are disclosed in a variety of patents. Exemplary patents include Shibani et al., U.S. Pat. Nos. 4,356,115; 4,636,343; 4,677, 177; 4,681,934; 4,711,936; 4,722,815; and others. Yashimaga, JP 4–108523, teaches a permselective membrane used for separation of chiral compounds using a polyvinyl chloride film containing high loadings of a substituted cyclodextrin and a plasticizer. Yoshenaga, JP 3–100065, uses an unsubstituted cyclodextrin in a film layer. Nakazima, U.S. Pat. No. 5,001,176; Bobo Jr. et al., U.S. Pat. No. 5,177,129; and others use cyclodextrin materials to act as an inclusion complex for film stabilizing components. Zejtli et al., United States Pat. No. 4,357,468 shows one specific application of the use of cyclodextrin materials as servants in separation techniques. The particular cyclodextrin material is a polyoxyalkylene substituted material used in separation schemes.

Many allegedly barrier materials have been suggested in the art but currently there is no suitable material that can act as a barrier for the large variety of potential contaminants that can pass through packaging materials into the contents of the package.

Accordingly, a substantial need exists for the development of new paperboard materials or laminants from virgin fiber, recycled fiber or mixtures thereof. The paperboard contains a barrier layer that can act both as a barrier to the passage of contaminants and as a trap for contaminant materials that can arise in new materials or from the recycle of fiber in the manufacture of paperboard.

BRIEF DISCUSSION OF THE INVENTION

We have found that the barrier properties of non-woven cellulosic webs can be substantially improved with a barrier layer comprising a film containing an effective barrier amount of a cyclodextrin. The passage of permeants through or the release of contaminant permeants from, a cellulosic web, can be reduced or prevented by forming the cellulosic web with a barrier layer containing an effective permeant or contaminate absorbing amount of a cyclodextrin or a substituted or derivatized cyclodextrin compound. The cyclodextrin compound used in this role is a cyclodextrin compound, substantially free of an inclusion complex compound, which can act as a trap or barrier to the passage of a permeant or contaminate through the web or from the web into the container. The improved cellulosic web operates by establishing a sufficient concentration of cyclodextrin compound, free of an inclusion complex compound, in the path of any permeant or contaminate passing through or passing from the cellulosic web. The cyclodextrin compounds that can be used in the invention include unsubstituted cyclodextrins and cyclodextrins that contain substituents on the available primary or secondary hydroxyl groups of the cyclodextrin rings. Such barrier layers can be corrugated or sheet laminated with or on the cellulosic web. Alternatively, the cyclodextrin material can be included in a coating composition that is coated on a surface or both surfaces of the cellulosic web after web formation. Such coatings can be formed in a variety of networks including extrusion coatings, Rotogravure coatings, etc. Further, the cyclodextrin material can be included in a thermoplastic film that can be used as one layer in a bilayer or multilayer laminate containing a cellulosic web. Such a laminate can contain additional layers of cellulosic materials or other types of barrier layers. The laminate can contain additional layers of a film material that can contain the cyclodextrin barrier or trap material or can optionally contain other ingredients. The cyclodextrin can be part of the film by extrusion or by coating a flexible cyclodextrin layer in the film.

For the purpose of this application, the term "web" refers to any non-woven sheet-like assembly of randomly oriented cellulosic fiber. Such webs are typically continuous webs and contain no substantial apertures. Such webs can take the form of thin paper sheets, heavy paper, cardboard, paperboard, card stock or chipboard stock or laminates made from paper, paperboard, thermoplastic webs or coated sheets thereof.

For the purpose of this application and claims the term "permeant" refers to a chemical compound or composition that, at ambient temperatures and pressures, can be transported through at least a portion of the cellulosic web. Such permeants can arise in the ambient atmosphere or environment, can be absorbed on one surface of the web and be transported through the cellulosic web interior to be released on the opposite web surface. Additionally, such permeants can arise as contaminants in the web or from ingredients used in manufacturing, and can be transported from the interior of the web to a surface of the web for release either into the ambient atmosphere or into any internal enclosed space surrounded by the web.

As used in this application, the term "trap" refers to a cyclodextrin or cyclodextrin derivative that can act to absorb and immobilize, within the web, any impurity in the web arising from impurities present during the paper making process. Such impurities can arise from contamination of the source of cellulosic fiber, for example, recycle of used cellulosic materials or by contamination arising from any other source. The term "barrier" means the prevention of transport of a permeant from one surface of a cellulosic web through the interior of the web for release on the opposite surface of the web.

BRIEF DISCUSSION OF THE DRAWING

FIG. 1 is a graphical representation of the dimensions of the cyclodextrin molecule without derivatization. An α-, β- and γ-cyclodextrin is shown.

DETAILED DISCUSSION OF THE INVENTION

Cellulosic Web

Paper or paperboard has a thin layered network of randomly oriented fibers bonded together through hydrogen bonding. Paper or paperboard products are made from bondable fibrous material and form a layered structure of fiber in random orientation. Cellulosic fibers are the prime material for papermaking, however, any paper or paperboard material can contain other fibers in combination with cellulosic materials.

Paper and paperboard are made from aqueous suspension of fibers. Cellulosic fibers are readily dispersed or suspended in water that serves as a carrier before the suspension is applied to a screen in the papermaking process. The primary source of fibrous materials used in paperboard manufacturing include wood pulp, waste paper such as newspaper, corrugated paperboard, deinked fiber, cotton, lint or pulp, and other materials. Waste paper also known as secondary fiber is becoming more and more important in paper and paperboard manufacture. The percentage of paperboard recycle as secondary fiber has substantially increased since 1980 becoming a major source of fiber. Cellulosic pulp typically made from hard and soft wood but can be made from any planned source of cellulosic material include ground wood pulp, pressurized ground wood pulp, ground wood pulp from chips, refinery mechanical pulp, chemi-refiner mechanical pulp, chemi thermomechanical pulp, thermochemical pulp, sodium sulfite treated TMP pulp, sulfonated chip and mechanical pulp, tandem thermomechanical pulp. In any of these processes, water elevated temperature chemical additives and other materials are added to chip wood to reduce the wood to a useful pulp material. In the recycle or pulping of secondary fibers, the used fiber is typically introduced into an aqueous bath containing a variety of chemicals that separate the cellulosic components of the paper into fiber and remove ink coatings and other materials in the recycled paper.

Paper or paperboard is made in a typical fourdrinier paper process using a fourdrinier paper machine. The fourdrinier paper machine typically comprises a head box for the clean pulp, a screen section for initial web formation rollers and presses in connection with the fourdrinier screen that removes additional water from the rough web. Presses that regulate thickness and surface quality and finally a take-up reel or storage portion. In the fourdrinier process, a stock aqueous pulp enters the head box and delivers a ribbon of aqueous stock to the fourdrinier water had a uniform dilution thickness and add-on speed. The head box contains a slice, a narrow opening in the head box through which the stock flows in a controlled thickness onto a wire mesh. The wire is a continuous belt of woven material originally metal wire but now most frequently a plastic web. The wire travels over a series of rollers that both keep the wire level and remove water from the rough cellulosic web. Water is removed from the pulp first by gravity, then by low pressure and finally by suction devices located under the wire. The paper web leaves the wire at this point. The wire in a continuous loop returns to the head box for additional stock. The rough cellulosic web, when in the press section comprising hard rolls that squeeze the paper gently to remove water, is compressed to promote bonding and to form a rough thickness. The cellulosic web then passes through and around a series of steam filled drums called dryer cans that remove residual water by evaporation. In the dryer section, chemicals can be added in a size press to the surface of the web. At the finishing end of the machine are calendar reel and rewinder rolls that act to press the sheet, to smooth the sheet, and to control final thickness. After finishing, the web is wound on a reel for further transport to use or further treatment.

The dried paper webs can be modified to improve properties. Both internal and external sizings can be used to prove water resistance. Wet strength agents and bonding additives can be used in forming the cellulosic web to aid in retaining wet strength. The web can be physically modified using a calendaring process. Machine calendar is a stack of steel rolls at the dry end of a paper making machine that compresses the web forming a flatter, smoother surface. This flat surface accepts print, feeds more smoothly in use in machines and can also adjust thickness. The surface of the web can also be pigmented with a pigmented coating. Pigmented coatings typically comprise a pigment and a binder material. Typical pigments include a clay, calcium carbonate, titanium dioxide or plastic pigments. The pigments are typically applied in the form of an aqueous suspension or dispersion of pigment material in the finder or adhesive composition. Typically binders or adhesives include starch, proteins, styrene butadiene dispersions or latices, polyvinyl acetate and latices, acrylic latices and others. Coatings are applied with conventional application equipment that ensure the coating is applied uniformly to the entire surface, the amount of coating obtains the appropriate or desired thickness or coat weight on the entire web and results in a smooth surface finish.

The cellulosic webs of the invention include newsprint on coated ground wood paper, coated papers, uncoated free sheets, writing paper, envelope stock, kraft stock, bristol board, tabulated card stock, unbleached packaging, wrapping shipping sack stock, bag and sack stock, packaging unbleached craft wrapping stock, wrapping stock, shipping stock, waxing stock, solid wood pulp paperboard, unbleached craft paperboard, unbleached liner board, carton-type board stock, milk carton board stock, heavy weight cup stock, bleached paperboard stock, recycled paperboard, construction paper and board, structural insulating board and others.

The paperboard of the invention can also include corrugated paperboard materials. Corrugated paperboard is typically made by first manufacturing a single facer comprising a fluted medium adherently attached to a top liner making a single faced board(one flat layer bonded to a corrugated sheet). In manufacturing the single facer material, the web is first corrugated and then combined with the liner board using commonly available starch-based corrugating adhesives. Once combined in the single facer, the corrugated material and the liner are permitted to bond and dry. After the single facer is complete, it is then bonded to a second liner using a similar corrugating adhesive material. To make double wall board or further layers of corrugated paperboard, similar process steps are repeated until a sufficiently number of layers is complete for the desired application.

The paperboard and corrugated paperboard materials of the invention can be used to manufacture various types of packages. Folded packages including corrugated container boxes, folding carton can be made from corrugated medium solid bleached or unbleached paperboard. Flexible containers can be made as bags, sacks, pouches, wrappers and labelled items made from paper laminates comprising a web film or foil clay coated paper laminates, thermoplastic material coated paper laminates or multilayer paper laminates. Rigid cylindrical containers can also be made for a variety of packaging needs such as for shipping bottles and jars, cans and drums, and other containers. The containers can be used for transporting foods, powders, garden materials, hardware and virtually any other consumer or industrial item requiring robust packaging.

Cyclodextrin

The cellulosic webs of the invention contain a cyclodextrin or a substituted or derivatized cyclodextrin compatible with the thermoplastic polymer. For this invention, compatible means that the cyclodextrin material can be uniformly dispersed into the cellulosic fiber or web, can retain the ability to trap or complex permeant materials or polymer impurity, and can reside in the polymer without substantial reductions in the important packaging characteristics of the web. Compatibility can be determined by measuring web characteristics such as tensile strength, tear resistance, permeability or transmission rates for permeants, surface smoothness, etc.

Cyclodextrin is a cyclic oligosaccharide consisting of at least five, preferably at least six glucopyranose units joined by α(1→4) linkages. Although cyclodextrin with up to twelve glucose residues are known, the three most common homologies (αcyclodextrin, βcyclodextrin and γ cyclodextrin) having six, seven and eight residues have been used.

Cyclodextrin is produced by a highly selective enzymatic synthesis. They consist of six, seven, or eight glucose monomers arranged in a torus or donut shaped ring, which are denoted α, β, or γ cyclodextrin respectively (See FIG. 1). The specific coupling of the glucose monomers gives the cyclodextrin a rigid, truncated conical molecular structure with a hollow interior of a specific volume. This internal cavity, which is lipophilic (i.e., is attractive to hydrocarbon materials in aqueous systems and is hydrophobic) when compared to the exterior, is a key structural feature of the cyclodextrin, providing the ability to the hydrocarbon portion of complex molecules (e.g., aromatics, alcohols, alkyl halides and aliphatic halides, carboxylic acids and their esters, etc.). The complexed molecule must satisfy the size criterion of fitting at least partially into the cyclodextrin internal cavity, resulting in an inclusion complex.

| CYCLODEXTRIN TYPICAL PROPERTIES | | | |
|---|---|---|---|
| PROPERTIES | α-CD | β-CD | γ-CD |
| Degree of Polymerization (n =) | 6 | 7 | 8 |
| Molecular Size (A°) | | | |
| inside diameter | 5.7 | 7.8 | 9.5 |
| outside diameter | 13.7 | 15.3 | 16.9 |
| height | 7.0 | 7.0 | 7.0 |
| Specific Rotation [α]$_D^{25}$ | +150.5 | +162.5 | +177.4 |
| Color of iodine complex | Blue | Yellow | Yellowish Brown |
| Solubility in water (g/100 ml) 25° C. | | | |
| Distilled Water | 14.50 | 1.85 | 23.20 |

The oligosaccharide ring forms a torus, that can be visualized as a truncated cone, with primary hydroxyl groups of each glucose residue lying on a narrow end of the torus. The secondary glucopyranose hydroxyl groups are located on the wide end. The parent cyclodextrin molecule, and useful derivatives, can be represented by the following formula (the ring carbons show conventional numbering) in which the vacant bonds represent the balance of the cyclic molecule:

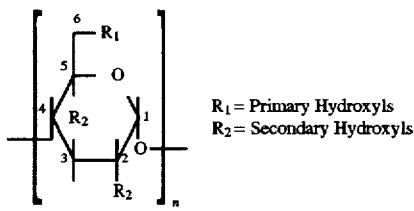

wherein $R_1$ and $R_2$ are primary or secondary hydroxyl as shown.

Cyclodextrin molecules have available for reaction with a chemical reagent the primary hydroxyl at the six position, of the glucose moiety, and at the secondary hydroxyl in the two and three position. Because of the geometry of the cyclodextrin molecule, and the chemistry of the ring substituents, all hydroxyl groups are not equal in reactivity. However, with care and effective reaction conditions, the cyclodextrin molecule can be reacted to obtain a derivatized molecule having all hydroxyl groups derivatized with a single substituent type. Such a derivative is a persubstituted cyclodextrin. Cyclodextrin with selected substituents (i.e.) substituted only on the primary hydroxyl or selectively substituted only at one or both the secondary hydroxyl groups can also be synthesized if desired. Further directed synthesis of a derivatized molecule with two different substituents or three different substituents is also possible. These substituents can be placed at random or directed to a specific hydroxyl. For the purposes of this invention, the cyclodextrin molecule needs to contain sufficient compatible substituent groups on the molecule to insure that the cyclodextrin material can be uniformly dispersed into the cellulosic material.

Apart from the introduction of substituent groups on the CD hydroxyl other molecule modifications can be used. Other carbohydrate molecules can be incorporated into the cyclic backbone of the cyclodextrin molecule. The primary hydroxyl can be replaced using $SN_2$ displacement, oxidized dialdehyde or acid groups can be formed for further reaction with derivatizing groups, etc. The secondary hydroxyls can be reacted and removed leaving an unsaturated group to which can be added a variety of known reagents that can add or cross a double bond to form a derivatized molecule. Further, one or more ring oxygen of the glycan moiety can be opened to produce a reactive site. These techniques and others can be used to introduce compatibilizing substituent groups on the cyclodextrin molecule.

The preferred preparatory scheme for producing a derivatized cyclodextrin material having a functional group compatible with the thermoplastic polymer involves reactions at the primary or secondary hydroxyls of the cyclodextrin molecule. Broadly we have found that a broad range of pendant substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphato cyclodextrin, imidazolyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well known groups. The formation of such groups on either the primary or secondary ring hydroxyls of the cyclodextrin molecule involve well known reactions. The acylation reaction can be conducted using the appropriate acid anhydride, acid chloride, and well known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin. Alkylating groups can be used to produce peralkylated cyclodextrin using sufficient reaction conditions exhaustively react available hydroxyl groups with the alkylating agent. Further, depending on the alkylating agent, the cyclodextrin molecule used in the reaction conditions, cyclodextrin substituted at less than all of the available hydroxyls can be produced. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl) mesyl (methane sulfonyl) or other related alkyl or aryl sulfonyl forming reagents can be used in manufacturing compatibilized cyclodextrin molecules for use in thermoplastic resins. The primary -OH groups of the cyclodextrin molecules are more readily reacted than the secondary groups. However, the molecule can be substituted on virtually any position to form useful compositions.

Such sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyl. The sulfonyl chloride is used at appropriate mole ratios depending on the number of target hydroxyl groups in the molecule requiring substitution. Both symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, monosubstituted cyclodextrin can be made wherein a single glucose moiety in the ring contains between one and three sulfonyl substituents. The balance of the cyclodextrin molecule remaining unreacted.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents, halogen derivatives of cyclodextrins can be manufactured as a feed stock for the manufacture of a cyclodextrin molecule substituted with a compatibilizing derivative. In such compounds the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphate groups. The 2, and 3, secondary hydroxyls can be branched using an alkyl phosphate group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxylethyl and corresponding oxime isomers, formyl methyl and its oxime isomers, carbylmethoxy (—O—CH$_2$—CO$_2$H), carbylmethoxymethyl ester (—O—CH$_2$CO$_2$—CH$_3$). Cyclodextrin with derivatives formed using silicone chemistry can contain compatibilizing functional groups.

Cyclodextrin derivatives with functional groups containing silicone can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are preferred including trimethylsilyl, mixed methyl-phenyl silyl groups, etc. We are aware that certain βCD and acetylated and hydroxy alkyl derivatives are available from American Maize-Products Co. (now cerestar USA), Corn Processing Division, Hammond, Ind.

Film

The barrier packaging material can be in the form of a coated cellulosic web or a cellulosic web/film laminate. The cyclodextrin can be a part of the web, a thin film or both. A film or a sheet is a flat unsupported section of a thermoplastic resin whose thickness is much smaller than its width or length. Films are generally regarded as being 0.25 millimeters (mm) or less, typically 0.01 to 20 mm thick. Sheet may range from about 0.25 mm to several centimeters (mm), typically 0.3 to 3 mm in thickness. Film or sheet can be used in combination with other sheet, structural units, etc. through lamination. Important properties include tensile strength, elongation, stiffness, tear strength and resistance; optical properties including haze, transparency; chemical resistance such as water absorption and transmission of a variety of permeant materials including water vapor and other permeants; electrical properties such as dielectric constant; and permanence properties including shrinkage, cracking, weatherability, etc.

Thermoplastic materials can be formed into barrier film using a variety of processes including blown thermoplastic extrusion, linear biaxially oriented film extrusion and by casting from molten thermoplastic resin, monomer or polymer (aqueous or organic solvent) dispersion. These methods are well known manufacturing procedures. The characteristics in the polymer thermoplastics that lead to successful barrier film formation are as follows. Skilled artisans manufacturing thermoplastic polymers have learned to tailor the polymer material for thermoplastic processing and particular end use application by controlling molecular weight (the melt index has been selected by the thermoplastic industry as a measure of molecular weight—melt index is inversely proportional to molecular weight, density and crystallinity). For blown thermoplastic extrusion polyolefins (polyalpha olefins such as LDPE low density polyethylene, LLDPE linear low density polyethylene, HDPE high density polyethylene) are the most frequently used thermoplastic polymers, although polypropylene, nylon, nitrites, PETG and polycarbonate are sometimes used to make blown film. Polyolefins typically have a melt index from 0.2 to 3 grams/10 mins., a density of about 0.910 to about 0.940 grams/cc, and a molecular weight (Mw) that can range from about 200,000 to 500,000. For biaxially oriented film extrusion the polymer most often used are olefin based—chiefly polyethylene and polypropylene (melt index from about 0.1 to 4 gm/10 mi. Preferably 0.4 to 4 grams/10 mins. and a molecular weight (Mw) of about 200,000 to 600,000). Polyesters and nylons can also be used. For casting, molten thermoplastic resin or monomer dispersion are typically produced from polyethylene or polypropylene. Occasionally, nylon, polyester and PVC are cast. For roll coating of aqueous based acrylic, urethane and PVDC, etc. dispersions are polymerized to an optimum crystallinity and molecular weight before coating.

A variety of thermoplastic materials are used in making film and sheet products. Such materials include poly(acrylonitrile-co-butadiene-co-styrene) polymers, acrylic polymers such as the polymethylmethacrylate, poly-n-butyl acrylate, poly(ethylene-co-acrylic acid), poly(ethylene-co-methacrylate), etc.; cellophane, cellulosics including cellulose acetate, cellulose acetate propionate, cellulose acetate butyrate and cellulose triacetate, etc.; fluoropolymers including polytetrafluoroethylene (teflon), poly(ethylene-co-tetrafluoroethylene) copolymers, (tetrafluoroethylene-co-propylene) copolymers, polyvinyl fluoride polymers, etc., polyamides such as nylon 6, nylon 6,6, etc.; polycarbonates; polyesters such as poly(ethylene-co-terephthalate), poly(ethylene-co-1,4-naphthalene decarboxylate), poly(butylene-co-terephthalate); polyamide materials; polyethylene materials including low density polyethylene; linear low density polyethylene, high density polyethylene, high molecular weight high density polyethylene, etc.; polypropylene, biaxially oriented polypropylene; polystyrene, biaxially oriented polystyrene; vinyl films including polyvinyl chloride, (vinyl chloride-co-vinyl acetate) copolymers, polyvinylidene chloride, polyvinyl alcohol, (vinyl chloride-co-vinylidene dichloride) copolymers, specialty films including polysulfone, polyphenylene sulfide, polyphenylene oxide, liquid crystal polyesters, polyether ketones, polyvinylbutyral, etc.

The thermoplastic film materials can be laminated to a cellulosic web using commonly available typically heat driven laminating techniques. In such techniques, the film can be joined to the cellulosic web substrate using two common methods. The film can be extruded directly onto the cellulosic web and bonded to the web with conventional thermal techniques. In extrusion coating processes, plastic pellets containing the cyclodextrin derivative are melted at high temperatures (commonly greater than about 350° C.). The molten plastic is extruded through a narrow slit or die. At the same instant this molten material comes into contact with a cellulosic web. It is immediately pressed with a very smooth and relatively cool chill roll (30°–40° C.). Such an operation imparts a smooth impervious surface of the plastic as well as forming a strong laminating bond to the cellulosic web. Appearance and nature of the coating is typically a function of the type of chill roll used and is not a characteristic of the plastic material.

Additionally, the film can be taken from a roll of film and laminated to the cellulosic web using heat techniques or through the use of a bonding layer which is commonly heat activated. A pre-extruded or precast film can be brought into contact with the cellulosic web, heated to a temperature greater than its melt point and then is immediately pressed with a smooth cool chill roll. Such laminating processes are typically completed using well known processes described above. Such a lamination can be improved using an adhesive material that can aid in forming a bonded film web laminate. Such materials are commonly coated on the film, on the cellulosic web prior to heat treatment.

The cyclodextrin materials can be incorporated into a barrier cellulosic web by coating the cellulosic web or a similar structure containing a cellulosic layer with a liquid coating composition containing an effective amount of a cyclodextrin or substituted cyclodextrin. Such coating compositions are typically formed using a liquid medium. Liquid mediums can include an aqueous medium or organic solvent media. Aqueous media are typically formed by combining water with additives and components that can form a useful coatable aqueous dispersion. Solvent based dispersions based on organic solvents can be made using known corresponding solvent base coating technology.

In forming the barrier layers of the invention, coatings can be formed either on a film which is later laminated on a film which is later laminated onto the cellulosic web or can be coated to form a film on the cellulosic web. Such coating processes involve the application of liquid to a traveling cellulosic web. Such coating processes commonly use machines having an application section and a metering section. Careful control of the amount and thickness of the coating obtains optimized barrier layers without waste of material. A number of coating machines are known such as tension sensitive coaters, for example, coaters using a metering rod, tension insensitive coating stations that can maintain coat weight even as web tensions vary, brush coating methods, air knife coaters, etc. Such coating machines can be used to coat one or both sides of a flexible film or one or both sides of a cellulosic web.

Coating machines described above commonly apply a liquid composition containing a film forming material, additives that can help form and maintain the coating composition along with the effective amount of the cyclodextrin or substituted cyclodextrin material. The film forming materials are often called a binder. Such binders exist in the final coating as a polymer of high molecular weight. Thermoplastic polymers or crosslinking polymers can both be used. Such binders are grouped into certain overlapping classes including acrylic, vinyl, alkyl, polyester, etc. Further, the compositions described above are materials that can be used in forming the polymer films also have corresponding materials that can be used in the formation of aqueous and solvent based coating compositions. Such coating compositions can be made by combining the liquid medium with solid materials containing the polymer, the cyclodextrin and a variety of useful additives. Commonly, the cyclodextrin materials added to the coating composition as part of the solids component. The solids present in the coating composition can contain from about 0.01 to about 10 wt % of the cyclodextrin compound, preferably about 0.1 wt % to 5 wt %, most preferably about 0.1 wt % to about 2 wt % of the cyclodextrin material based on the total solids in the solvent based dispersion composition.

Packages and Packed Items

The cellulosic web containing the cyclodextrin or compatible derivatized cyclodextrin inclusion complex can be used in a variety of packaging formats to package a variety of items. General packaging ideas can be used. For example, the items can be packaged entirely in a pouch, bag, etc. Further, the web can be used as a paper closure on a rigid plastic container. Such containers can have a rectangular, circular, square or other shaped cross-section, a flat bottom and an open top. Both the container and a paper or web closure can be made of the thermoplastic coated or laminated materials of the invention. Further, the thermoplastic coated or laminated materials of the invention can be used in the formation of blister pack packaging, clam shell type enclosures, tub, tray, etc. Products that can be packaged in the methods of the invention include coffee, ready to eat cereal, frozen pizza, cocoa or other chocolate products, dry mix gravies and soups, snack foods (chips, crackers, popcorn, etc.), baked foods, pastries, breads etc., dry pet food (cat food, etc.), butter or butter-flavor notes, meat products, in particular butter or butter-flavor notes used in the manufacture of microwave popcorn in microwaveable paper containers, fruits and nuts, etc.

The above explanation of the nature of the cyclodextrin derivatives, thermoplastic films, coatings or manufacturing detail regarding the production of film coatings and webs, and the processes of cyclodextrin to make compatible derivatives provides a basis for understanding technology involving incorporating compatible cyclodextrin in a cellulosic web or paperboard structure for barrier purposes. The following examples, film preparation and permeation data provide a further basis for understanding the invention and includes the best mode.

After our work in producing derivatives of cyclodextrins and compounding the cyclodextrins in thermoplastic films, we have found that the cyclodextrins can be readily derivatized using a variety of known chemical protocols. The cyclodextrin material can be melt blended into thermoplastic materials smoothly resulting in clear extrudable thermoplastic materials with the cyclodextrin materials uniformly distributed throughout the thermoplastic. Further, we have found that the cyclodextrin derivatives can be combined with a broad variety of thermoplastic films. The cyclodextrin materials can be incorporated into the films in a broad range of cyclodextrin concentrations. The cyclodextrin containing thermoplastic materials can be blown into films of varying thickness and can be blown free of melt fracture or other film or sheet variation. We have also found that barrier layers can be formed from polymer dispersions containing the cyclodextrin. We have found in our experimentation that the barrier properties, i.e. reduction in transmission rate of aromatic hydrocarbons, aliphatic hydrocarbons, ethanol and water vapor can be achieved using the cyclodextrin derivative technology. We have also found that the use of cyclodextrin materials improve the surface properties of the film. The surface tension of the film surface and surface electrical properties were also improved. Such a result increases the utility of the films of the invention in coating, printing, laminating, handling, etc. In initial work we have also found (1) several modified cyclodextrin candidates were found to be compatible with the LLDPE resin and provide good complexation of residual LLDPE volatile contaminants as well as reduce organic permeants diffusing through the film. (2) Unmodified βCD adversely affects transparency, thermal stability, machinability, and barrier properties of the film. Conversely, selected modified βCD (acetylated and trimethylsilyl ether derivatives) have no affect on transparency and thermal stability. The machinability of the extruded plastic material is effected somewhat causing some surface defects, thereby reducing the barrier properties of the film. (3) Films containing a modified βCD composition (1% by weight) reduce aromatic permeants by 35% at 72° F. and 38% at 105° F. ; aliphatic permeants were reduced by only 9% at 72° F. These results would improve significantly if worst case shelf-life testing conditions were not used to test the films. (4) Complexation rates were different for aromatic and aliphatic permeants. Films containing modified βCD had better complexation rates for aromatics (gasoline-type compounds) than aliphatic (printing ink-type compounds). Conversely, film coating had significantly better complexation of aliphatic compound than aromatic compounds. (5) βCD containing acrylic coatings were the star performers reducing aliphatic permeants from 46% to 88%, while aromatics were reduced by 29%.

QUALITATIVE PREPARATION

Initially, we produced four experimental test films. Three of the films contained β-cyclodextrin βCD at loading of 1%, 3% and 5% (wt./wt.) while the fourth was a control film made from the same batch of resin and additives but without βCD. The 5 loaded βCD film was tested for complexation of residual organic in the test film. Even though βCD was found to effectively complex residual organics in the linear low density polyethylene (LLDPE) resin, it was incompatible with the resin and formed βCD particle agglomerations.

We have evaluated nine modified βcyclodextrins and a milled β-cyclodextrin (particle size 5 to 20 microns). The different cyclodextrin modifications were acetylated, octanyl succinate, ethoxyhexyl glycidyl ether, quaternary amine, tertiary amine, carboxymethyl, succinylated, amphoteric and trimethylsilyl ether. Each experimental cyclodextrin (1% loading wt/wt) was mixed with low density polyethylene (LLDPE) using a Littleford mixer and then extruded using a twin screw Brabender extruder.

The nine modified cyclodextrin and milled cyclodextrin LLDPE profiles were examined under an optical microscope at 5X and 200X magnification. The microscopic examination was used to visually check for compatibility between LLDPE resin and cyclodextrin. of the ten cyclodextrin candidates tested, three (acetylated, octanyl succinate and trimethylsilyl ether) were found visually to be compatible with the LLDPE resin.

Complexed residual film volatiles were measured using cryotrapping procedure to test 5% βCD film sample and three extruded profiles containing 1% (wt/wt) acetylated βCD octanyl succinate βCD and trimethylsilyl ether. The method consists of three separate steps; the first two are carried out simultaneously while the third, an instrumental technique for separating and detecting volatile organic compounds, is conducted after one and two. In the first step, an inert pure, dry gas is used to strip volatiles from the sample. During the gas stripping step, the sample is heated at 120° C. The sample is spiked with a surrogate (benzene-d6) immediately prior to the analysis. Benzene-$d_6$ serves as an internal QC surrogate to correct each set of test data for recovery. The second step concentrates the volatiles removed from the sample by freezing the compounds from the stripping gas in a headspace vial immersed in a liquid nitrogen trap. At the end of the gas-stripping step, an internal standard (toluene-d8) is injected directly into the headspace vial and the vial is capped immediately. Method and system blanks are interspersed with samples and treated in the same manner as samples to monitor contamination. The concentrated organic components are then separated, identified and quantitated by heated headspace high resolution gas chromatography/mass spectrometry (HRGC/MS).

The results of the residual volatile analyses are presented in the table below:

TABLE 1

| Sample Identification | % Volatile Complexation as Compared to Control |
| --- | --- |
| 5% βCD Blown Film | 80 |
| 1% Acylated βCD Profile | 47 |
| 1% Octanyl Succinate βCD Profile | 0 |
| 1% Trimethylsilyl ether Profile | 48 |
| 1% βCD Milled Profile | 29 |

In these preliminary screening tests, βCD derivatives were shown to effectively complex trace volatile organics inherent in low density polyethylene resin used to make experimental film. In 5% βCD loaded LLDPE film, approximately 80% of the organic volatiles were complexed. However, all βCD films (1% and 5%) had an off-color (light brown) and off-odor. The color and odor problem is believed to be the result of direct decomposition of the CD or impurity in the CD. Two odor-active compounds (2-furaldehyde and 2-furanmethanol) were identified in the blown film samples.

Of the three modified compatible CD candidates (acetylated, octanyl succinate and trimethylsilyl ether), the acetylated and trimethylsilyl ether CD were shown to effectively complex trace volatile organics inherent in the LLDPE resin. One percent loadings of acetylated and trimethylsilyl ether (TMSE) βCD showed approximately 50% of the residual LPDE organic volatiles were complexed, while the octanyl succinate CD did not complex residual LLDPE resin volatiles. Milled βCD was found to be less effective (28%) than the acetylated and TMSE modified βCD's.

Plastic packaging materials all interact to some degree with the food product they protect. The main mode of interaction of plastic packaging of food is through the migration of organic molecules from the environment through the polymer film into the head space of the package where they are absorbed by the food product. Migration or transfer of organic molecules of the package to the food, during storage, is effected by environmental conditions such as temperature, storage time, and other environmental factors (e.g., humidity, type of organic molecules and concentration thereof). Migration can have both quality (consumer resistance) and toxicological influence. The objective of packaging film testing is to measure how specific barriers may influence the quality of packaged individual foods. To simulated accelerated shelf-life testing for low-water-activity food products, the testing was conducted at a temperature of 72° F. and 105° F., and a relative humidity of 60%. These temperature and humidity conditions are probably similar to those found in uncontrolled warehouses, in transit, and in storage.

If a polymer is moisture sensitive, the relative humidity can affect the film's performance especially in low-water-activity food products. Because a packaging film during actual end-use conditions will be separating two moisture extremes, relative humidity in the permeation device was controlled on both sides of the film. The environment side, representing the outside of the package, was maintained at 60% relative humidity, and the sample side, representing the inside of a package containing a low-water-activity product, at 0.25.

A combination of permeants was used to measure the function and performance of the CD. A combination was used to be realistic, since gasoline (principally an aromatic hydrocarbon mixture) and printing ink solvents (principally an aliphatic hydrocarbon mixture) are not formed from a single compound but are a mixture of compounds.

The aromatic permeant contained ethanol (20 ppm), toluene (3 ppm), p-xylene (2 ppm), o-xylene (1 ppm), trimethylbenzene (0.5 ppm) and naphthalene (0.5 ppm). The aliphatic permeant, a commercial paint solvent blend containing approximately twenty (20) individual compounds, was 20 ppm.

A permeation test device useful in determining the permeation of materials through compositions of the invention is shown in Wood et al., U.S. Pat. No. 5,505,969 at Column 16, lines 15–19 and in FIG. 3. Wood et al., U.S. Pat. No. 5,505,969 is incorporated by reference herein with respect to the use of the permeation test device in permeation testing.

The permeation test device consists of two glass permeation cells or flasks with cavities of 1200 ml (environment cell or feed side) and 300 ml (sample cell or permeating side).

Experimental film performance was measured in the closed-volume permeation device. High-resolution gas chromatograph (HRGC) operated with a flame ionization detector (FID) was used to measure the change in the cumulative penetrant concentration as a function of time. Sample-side (food product side) compound concentrations are calculated from each compound's response factor. Concentrations are reported in parts per million (ppm) on a volume/volume basis. The cumulative penetrant concentration on the sample-side of the film is plotted as a function of time.

We produced four experimental test films. Three of the films contained βCD at loading of 1%, 3% and 5% (wt/wt) while the fourth was a control film made from the same batch of resin and additives but without βCD.

A second experimental technique was also undertaken to determine whether βCD sandwiched between two control films will complex organic vapors permeating the film. The experiment was carried out by lightly dusting βCD between two control film sheets.

The testing showed the control film performed better than βCD loaded films. The permeation test results also demonstrated the higher the βCD loading the poorer the film performed as a barrier. The test results for sandwiching βCD between two control films showed βCD being twice as effective in reducing permeating vapors than the control samples without βCD. This experiment supported that CD does complex permeating organic vapors in the film if the film's barrier qualities are not changed during the manufacturing process making the film a less effective barrier.

The 1% TMSE βCD film was slightly better than the 1% acetylated βCD film (24%—vs—26%) for removing aromatic permeants at 72° F. adding more modified CD appeared to have no improvement.

For aromatic permeants at 105° F., both 1% TMSE βCD and 1% acetylated βCD are approximately 13% more effective removing aromatic permeants than 72° F. The 1% TMSE film was again slightly better than the 1% film (36%—vs—31%) for removing aromatic permeants.

The 1% TMSE film was more effective initially removing aliphatic permeants than the 1% acetylated βCD film at 72° F. But for the duration of the test, 1% TMSE βCD was worse than the control while 1% acetylated βCD removed only 6% of the aliphatic permeants.

We produced two experimental aqueous coating solutions. One solution contained hydroxyethyl βCD (35% by weight) and the other solution contained hydroxypropyl βCD (35 by weight). Both solutions contained 10% of an acrylic emulsion comprising a dispersion of polyacrylic acid having a molecular weight of about 150,000 (Polysciences, Inc.) (15% solids by weight) as a film forming adhesive. These solutions were used to hand-coat test film samples by laminating two LLDPE films together. Two different coating techniques were used. The first technique very slightly stretched two film samples flat, the coating was then applied using a hand roller, and then the films were laminated together while stretched flat. The Rev. 1 samples were not stretched during the lamination process. All coated samples were finally placed in a vacuum laminating press to remove air bubbles between the film sheets. Film coating thicknesses were approximately 0.0005 inches. These CD coated films and hydroxylmethyl cellulose coated control films were subsequently tested.

A reduction in aromatic and aliphatic vapors by the hydroxyethyl βCD coating is greater in the first several hours of exposure to the vapor and then diminishes over the next 20 hours of testing. Higher removal of aliphatic vapors than aromatic vapors was achieved by the hydroxyethyl βCD coating; this is believed to be a function of the difference in their molecular size (i.e., aliphatic compounds are smaller than aromatic compounds). Aliphatic permeants were reduced by 46% as compared to the control over the 20 hour test period. Reduction of aromatic vapors was 29% as compared to the control over the 17 hour test period.

The Rev. 1 coated hydroxyethyl βCD reduced the aliphatic permeants by 87% as compared to the control over the 20 hour test period. It is not known if the method of coating the film was responsible for the additional 41% reduction over the other hydroxyethyl βCD coated film.

The hydroxyethyl βCD coating was slightly better for removing aromatic permeants than the hydroxypropyl βCD coating (29%—vs—20%) at 72° F.

These coated films are useful for lamination on cellulosic webs to form the barrier layers of the invention.

LARGE SCALE FILM EXPERIMENTAL

Preparation of Cyclodextrin Derivatives

Example I

An acetylated β-cyclodextrin was obtained that contained 3.4 acetyl groups per cyclodextrin on the primary —OH group.

Example II

Trimethyl Silyl Ether of β-cyclodextrin Into a rotary evaporator equipped with a 4000 milliliter round bottom flask and a nitrogen atmosphere, introduced at a rate of 100 milliliters $N_2$ per minute, was placed three liters of dimethylformamide. Into the dimethylformamide was placed 750 grams of β-cyclodextrin. The β-cyclodextrin was rotated and dissolved in dimethylformamide at 60° C. After dissolution, the flask was removed from the rotary evaporator and the contents were cooled to approximately 18° C. Into the flask, placed on a magnetic stirrer and equipped with a stir bar, was added 295 milliliters of hexamethyldisilylazine (HMDS-Pierce Chemical No. 84769), followed by the careful addition of 97 milliliters of trimethylchlorosilane (TMCS -Pierce Chemical No. 88531). The careful addition was achieved by a careful dropwise addition of an initial charge of 20 milliliters and after reaction subsides the careful dropwise addition of a subsequent 20 milliliter portions, etc. until addition is complete. After the addition of the TMCS was complete, and after reaction subsides, the flask and its contents were placed on the rotary evaporator, heated to 60° C. while maintaining an inert nitrogen atmosphere flow of 100 milliliters of $N_2$ per minute through the rotary evaporator. The reaction was continued for four hours followed by removal of solvent, leaving 308 grams of dry material. The material was removed from the flask by filtering, washing the filtrate with deionized water to remove the silylation products, vacuum oven drying (75° C. at 0.3 inches of Hg) and stored as a powdered material and maintained for subsequent compounding with a thermoplastic material. Subsequent spectrographic inspection of the material showed the β-cyclodextrin to contain approximately 1.7 trimethylsilylether substituent per β-cyclodextrin molecule. The substitution appeared to be commonly on a primary 6-carbon atom.

Example III

An hydroxypropyl β-cyclodextrin was obtained with 1.5 hydroxypropyl groups per molecule on the primary 6-OH group of the βCD.

Example IV

An hydroxyethyl β-cyclodextrin was obtained with 1.5 hydroxyethyl groups per molecule on the primary 6-OH group of the βCD.

Preparation of Films

We prepared a series of films using a linear low density polyethylene resin, βCD and derivatized βCD such as the acetylated or the trimethylsilyl derivative of a β-cyclodextrin. The polymer particles were dry blended with the powdered β-cyclodextrin and β-cyclodextrin derivative material, a fluoropolymer lubricant (3M) and the antioxidant until uniform in the dry blend. The dry blend material was mixed and extruded in a pellet form in a Haake System 90, ¾" conical extruder. The resulting pellets were collected for film preparation.

Table IA displays useful film extruder conditions. The films were blown in an extrusion device apparatus shown in Wood et al., U.S. Pat. No. 5,505,969. Wood et al., U.S. Pat. No. 5,505,969 is incorporated by reference herein with respect to the use of the extrusion device in film manufacture. Films are conventionally manufactured by extruding a thermoplastic tube from an extrusion die. The tube is collapsed and layered using conventional rollers into a typical film. The extruded tube is inflated using air under pressure blown through air inlet tubes in conventional extruder equipment. The thermoplastic is melted in the extruder. The extruder temperature is typically monitored in a mixing zone. The melt temperature is taken in the melt zone while the die temperature is typically taken in the die. The extrudate is cooled using an air blown cooling stream from a cooling ring. The general schematic background of such an extruder is representative of conventional Kiefel blown film extruders using a 40 millimeter diameter die, used in the actual preparation of the blown film. The film is manufactured according to the above protocol and is reported in Table IB. The film was tested for transmission rates at a variety of environmental test conditions. The test conditions are discussed below in Table II.

TABLE IA

| 0.5% TMSE Pelletizing 1-19-94 | | | | | | | |
|---|---|---|---|---|---|---|---|
| Run Time | 0 min 13 sec | Torque Tot. | Torque | 4866 meter-gram 0.0 mkg-min | | Rotor Aux. | 198 rpm 0% |
| Channels | 1 | 2 | 3 | 4 | 5 | 6 | |
| Melt Temp | 37 | 41 | 41 | 41 | 41 | | °C. |
| Set Temp | 150 | 160 | 160 | 170 | 0 | 0 | °C. |
| Deviation | 0 | 0 | 0 | 0 | 0 | 0 | °C. |
| Cooling | Yes | Yes | Yes | Yes | | | |
| Pressure | 0 | 0 | 2739 | 0 | 0 | | psi |

TABLE IB

Extruded Film (Exxon LL3201)
Made With Low Density Polyethylene

| Roll No. | Sample ID | Fluoropolymer Additive[1] | Extruder Temp. Zone 3 (F.) | Melt Temp (F.) | Die Temp. Zone 3 (F.) | Lbs./Hr | RPM | Die Gap | Comments |
|---|---|---|---|---|---|---|---|---|---|
| 1 | Control | 500 ppm | 428 | 406 | 406 | 30.1 | 50 | 24 | |
| 2 | 1% Ex. I | 1000 ppm | 441 | 415 | 420 | 29.7 | 50 | 35 | |
| 3 | 1% Ex. I | 1000 ppm | 441 | 416 | 420 | 28.5 | 50 | 35 | |
| 4 | 1% Ex. I | 500 ppm | 441 | 415 | 420 | 29.9 | 50 | 35 | |
| 5 | 1% Ex. I | 500 ppm | 418 | 405 | 414 | 29.9 | 50 | 35 | |
| 6 | 1% Ex. I | 500 ppm | 421 | 397 | 414 | 29.0 | 50 | 35 | |
| 7 | 0.5% Ex. I | 500 ppm | 421 | 403 | 415 | 29.0 | 50 | 35 | |
| 8 | 2% Ex. I | 500 ppm | 421 | 404 | 415 | 27.7 | 50 | 35 | Very slight melt fracture |
| 9 | 1% Ex. II | 500 ppm | 421 | 406 | 415 | 28.3 | 50 | 35 | Particles in film. |
| 10 | 1% Ex. II | 500 ppm | 426 | 410 | 415 | 26.7 | 50 | 35 | Particles in film. |
| 11 | 1% Ex. II | 500 ppm | 432 | 415 | 414 | 29.0 | 50 | 35 | Particles in film. Very slight yellowing to film. |
| 12 | 1% Ex. II | 500 ppm | 431 | 414 | 415 | 21.5 | 39 | 35 | Particles in film. |
| 13 | 0.5% Ex. II | 500 ppm | 431 | 415 | 415 | 27.7 | 50 | 35 | Particles in film. |
| 14 | 0.5% Ex. II | 500 ppm | 425 | 410 | 415 | 28.9 | 50 | 35 | Particles in film. |
| 15 | 2% Ex. II | 500 ppm | 410 | 414 | 415 | 20.2 | 38 | 35 | Particles in film. Very slight yellowing to film. |
| 16 | 2% Ex. II | 500 ppm | 422 | 415 | 415 | 20.5 | 38 | 35 | Particles in film. Very slight yellowing to film. |
| 17 | 2% Ex. II | 500 ppm | 422 | 416 | 415 | 20.5 | 38 | 35 | Particles in film. Very slight yellowing in film. |

[1]Also contains 500 ppm Irganox 1010 antioxidant and 1000 ppm IrgaFos 168.

TABLE II

| Roll Sample ID Number | Test Conditions | | | |
|---|---|---|---|---|
| | Temp. (F.) | Sample Side | Environ. Side | Permeant[2] |
| Roll #2 Roll #3 Roll #5 | 72 | Rm % RH | Rm % RH | Aromatic/Alcohol |
| Roll #6 Roll #5 Roll #8 | | | | |
| Roll #7 Roll #5 Roll #8 | 72 | 0.25 Aw | 60% RH | Aromatic/Alcohol |
| Roll #7 Roll #5 Roll #8 | 72 | .60 Aw | 30% RH | Aromatic/Alcohol |
| Roll #2 Roll #3 Roll #4 Roll #5 Roll #6 Roll #8 | 105 | Rm % RH | Rm % RH | Aromatic/Alcohol |
| Roll #12 Roll #7 Roll #5 Roll #8 | 105 | 0.25 Aw | 15% RH | Aromatic/Alcohol |
| Roll #13 Roll #14 | 72 | Rm % RH | Rm % RH | Aromatic/Alcohol |
| Roll #9 Roll #9 Roll #11 Roll #12 Roll #15 Roll #16 Roll #17 | | | | |

TABLE II-continued

Test Conditions

| Roll Sample ID Number | Temp. (F.) | Sample Side | Environ. Side | Permeant[2] |
|---|---|---|---|---|
| Roll #14 | 105 | Rm % RH | Rm % RH | Aromatic/Alcohol |
| Roll #15 | | | | |
| 10% Ex. III in PVdC | 72 | 0.25 Aw | 60% RH | Aromatic/Alcohol |
| 20% Ex. III in PVdC | | | | |
| 5% Ex. III/ Acrylic | 72 | Rm % RH | Rm % RH | Aromatic/Alcohol |
| 10% Ex. III/ Acrylic | | | | |
| Roll #7 | 72 | Rm % RH | Rm % RH | Naptha |
| Roll #5 | | | | |
| Roll #8 | | | | |
| Roll #12 | 72 | Rm % RH | Rm % RH | Naptha |
| Roll #15 | | | | |

[2]7 ppm aromatic plus 20 ppm ETOH.
[3]7 ppm aromatic plus 20 ppm ETOH.
[4]40 ppm Naphtha The results of the testing show that the inclusion of a compatible cyclodextrin material in the thermoplastic films of the invention substantially improves the barrier properties by reducing transmission rate of a variety of permeants. The data showing the improvement in transmission rate is shown below in the following data tables.

Comparison of Transmission Rates in Modified β-Cyclodextrin - LPDE Films

Temperature 72° F.
Sample Side: Room % RH
Environment: Room % RH

| Sample Identification | Aromatic Transmission Rate* | Aromatics % Improvement Over Control | Total Volatiles Transmission Rate* | Tot. Volitiles % Improvement Over Control |
|---|---|---|---|---|
| Control Film | 3.35E-04 | 0% | 3.79E-04 | 0% |
| 1.0% CS-001 (Roll #2) | 3.18E-04 | 5% | 3.61E-04 | 5% |
| 1.0% CS-001 (Roll #3) | 2.01E-04 | 40% | 2.55E-04 | 33% |
| 1.0% CS-001 (Roll #5) | 2.67E-04 | 20% | 3.31E-04 | 13% |
| 1.0% CS-001 (Roll #6) | 3.51E-04 | -5% | 3.82E-04 | -1% |

Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 7.81E-03 | 0% |
| 0.5% CS-001 (Roll #7) | 7.67E-03 | 2% |
| 1% CS-001 (Roll #5) | 7.37E-03 | 6% |
| 2% CS-001 (Roll #8) | 6.53E-03 | 16% |

Temperature 72° F.
Sample Side: Room % RH
Environment: Room % RH

| Sample Identification | Aromatic Transmission Rate* | Aromatics % Improvement Over Control | Total Volatiles Transmission Rate* | Tot. Volitiles % Improvement Over Control |
|---|---|---|---|---|
| Control Film (Roll #1) | 5.16E-04 | 0% | 5.63E-04 | 0% |
| 1.0% CS-001 (Roll #5) | 4.01E-04 | 22% | 5.17E-04 | 8% |
| 2.0% CS-001 (Roll #8) | 2.91E-04 | 44% | 3.08E-04 | 45% |

Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 7.81E–03 | 0% |
| 0.5% CS-001 (Roll #7) | 7.67E–03 | 2% |
| 1% CS-001 (Roll #5) | 7.37E–03 | 6% |
| 2% CS-001 (Roll #8) | 6.53E–03 | 16% |

Comparison of Transmission Rates in Modified β-Cyclodextrin - LLDPE Films

| Sample Identification | Aromatic Transmission Rate* | Aromatics % Improvement Over Control | Total Volatiles Transmission Rate* | T. Volatiles % Improvement Over Control |
|---|---|---|---|---|
| Temperature 72° F. Sample Side: 0.25 Aw Environment: 60% RH | | | | |
| Control Film (Roll #1) | 3.76E–04 | 0% | 3.75E–04 | 0% |
| 0.5% CS-001 (Roll #7) | 2.42E–04 | 36% | 2.41E–04 | 36% |
| 1% CS-001 (Roll #5) | 3.39E–04 | 10% | 3.38E–04 | 10% |
| 2% CS-001 (Roll #8) | 2.48E–04 | 34% | 2.47E–04 | 34% |

Comparison of Transmission Rates in Modified β-Cyclodextrin - LPDE Films

Temperature 105° F.
Sample Side: Room % RH
Environment: Room % RH

| | | | | |
|---|---|---|---|---|
| Control Film (Roll #1) | 1.03E–03 | 0% | 1.13E–03 | 0% |
| 1% CS-001 (Roll #2) | 5.49E–04 | 47% | 5.79E–04 | 49% |
| 1% CS-001 (Roll #3) | 4.74E–04 | 54% | 5.00E–04 | 56% |
| 1% CS-001 (Roll #4) | 6.41E–04 | 38% | 6.83E–04 | 40% |
| 1% CS-001 (Roll #5) | 5.22E–04 | 49% | 5.54E–04 | 51% |
| 1% CS-001 (Roll #6) | 4.13E–04 | 60% | 4.39E–04 | 61% |
| 2% CS-001 (Roll #8) | 4.94E–04 | 42% | 6.18E–04 | 45% |
| 1% TMSE (Roll #12) | 8.32E–04 | 19% | 8.93E–04 | 21% |
| Control Film (Roll #1) | 4.34E–04 | 0% | 4.67E–04 | 0% |
| 0.5% CS-001 (Roll #7) | 4.03E–04 | 7% | 4.41E–04 | 6% |
| 1.0% CS-001 (Roll #5) | 5.00E–04 | –15% | 5.33E–04 | –14% |
| 2.0% CS-001 (Roll #8) | 3.96E–04 | 9% | 3.94E–04 | 16% |

Temperature 72° F.
Sample Side: Room % RH
Environment: Room % RH

| | | | | |
|---|---|---|---|---|
| Control Film | 3.09E–04 | 0% | 3.45E–04 | 0% |
| 0.5% TMSE (Roll #13) | 2.50E–04 | 19% | 2.96E–04 | 14% |
| 0.5% TMSE (Roll #14) | 2.37E–04 | 23% | 2.67E–04 | 33% |
| 1% TMSE (Roll #9) | 2.67E–04 | 14% | 3.05E–04 | 12% |
| 1% TMSE (Roll #10) | 4.85E–04 | –57% | 5.27E–04 | –53% |
| 1% TMSE (Roll #11) | 2.58E–04 | 17% | 2.92E–04 | 15% |
| 1% TMSE (Roll #12) | 2.15E–04 | 31% | 2.55E–04 | 26% |
| 2% TMSE | 2.54E–04 | 18% | 3.04E–04 | 12% |

-continued

| | | | | |
|---|---|---|---|---|
| (Roll #15) | | | | |
| 2% TMSE | 2.79E–04 | 10% | 3.21E–04 | 7% |
| (Roll #16) | | | | |
| 2% TMSE | 2.81E–04 | 9% | 3.24E–04 | 6% |
| (Roll #17) | | | | |

Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 9.43E–03 | 0% |
| 1% TMSE (Roll #12) | 1.16E–02 | –23% |
| 2% TMSE (Roll #15) | 1.56E–02 | –65% |

Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 8.36E–04 | 0% | 9.05E–04 | 0% |
| 0.5% TMSE (Roll #14) | 6.77E–04 | 19% | 7.25E–04 | 20% |
| 2% TMSE (Roll #15) | 6.36E–04 | 24% | 6.81E–04 | 25% |

Temperature 72° F.
Sample Side: 0.25 Aw
Environment: 60% RH

| | | | | |
|---|---|---|---|---|
| PVdC Control | 6.81E–05 | 0% | 1.05E–04 | 0% |
| PVdC w/10% HP B-CyD | 1.45E–05 | 79% | 2.39E–05 | 77% |
| PVdC w/20% HP B-Cyd | 9.71E–05 | –42% | 1.12E–04 | –7% |

Temperature 72° F.
Sample Side: Room % RH
Environment: Room % RH

| | | | | |
|---|---|---|---|---|
| Control Acrylic | 2.07E–06 | 0% | 2.10E–05 | 0% |
| 5% HP B-CyD/ Acrylic | 1.50E–06 | 27% | 2.07E–05 | 1% |
| 10% HP B-CyD/ Acrylic | 4.13E–06 | –100% | 4.30E–05 | –105% |

\* $\frac{\text{qm} \cdot 0.001 \text{ in.}}{100 \text{ in}^2 \cdot 24 \text{ hrs.}}$ We discovered we could form barrier films or coatings from a liquid coating composition. Such compositions can be aqueous or solvent based. We prepared a series of aqueous coatings containing hydroxypropyl βCD. One of the coatings was prepared from a 10% acrylic emulsion (a polyacrylic acid polymer having a molecular weight of about 150,000 purchased from Polysciences, Inc.). The 10% acrylic emulsion contained hydroxypropyl βCD at a 5% and 10% by weight loading. These solutions were used to hand-coat test film samples by laminating two films. The coatings were applied to linear low density polyethylene film sheet containing 0.5% acetylated βCD (Roll No. 7) and to a second film sheet containing 2% acetylated βCD (Roll No. 8) using a hand roller and then laminating the films. The films were not stretched during lamination. All coated samples were placed in a vacuum laminating press to remove air bubbles between the film sheets. The acrylic coating thickness was about 0.0002 inch. An acrylic coated control was prepared in an identical manner containing no hydroxypropyl βCD. The multilayer structure was tested in a permeation test device useful in determining the permeation of materials through compositions of the invention.

Such a permeation test device is shown in Wood et al., U.S. Pat. No. 5,505,969, at Column 16, lines 15–19 and in FIG. 3. Wood et al., U.S. Pat. No. 5,505,696 is incorporated by reference herein with respect to the use of the permeation test device in permeation testing. In performing the tests with the multilayer structure, the structure was placed in the test cell with the 0.5% acetylated βCD film facing the environmental flask side.

A second coating was prepared from a vinylidene chloride latex (PVDC, 60 wt-% solids) purchased from Dagax Laboratories, Inc. The PVDC latex coating was prepared with two levels of hydroxypropyl βCD—10% and 20% by weight of the derivatized cyclodextrin. These solutions were used to hand-coat linear low density polyethylene test film samples by laminating the two films together. The coatings were applied to two control film sheets (rolled into one) using a hand roller and laminated together. The films were not stretched during lamination process. All coated samples were placed in a vacuum laminating press to remove air bubbles between the film sheets. The PVDC coating thickness was approximately 0.0004 inch. A PVDC coated control was prepared in an identical manner but without hydroxypropyl βCD. These coatings are adequate for cellulosic web coatings. Such coatings are made in similar fashion with th e film coatings.

The data following the preparatory examples showing improvement in transmission rate was obtained using the following general test meth od.

Method Summary

This method involves experimental techniques designed to measure the permeability of selected organic molecules through food packaging films, using a static concentration gradient. The test methodology simulate s acc elerated shelf-life testing conditions by implementing various storage humidities, product water activities and temperature condition s and using organic molecule concentrations found in previously tested food products to simulate outside-the-package organic vapors in the permeation test cell. This procedure allows for the determinat ion of the following compounds: ethanol, toluene, p-xylene, o-xylene, 1,2,4-trimethyl benzene, naphthalene, naphtha solvent blend, etc.

TABLE 1

Permeant Test Compounds

| Test Compounds | Threshold Odor Conc. ul/L ppm | Environmental Cell Conc. ul/L ppm |
|---|---|---|
| Ethanol | 5–5000 | 20 |
| Toluene | 0.10–20 | 3 |
| p-Xylene | 0.5 | 2 |
| o-Xylene | 0.03–12 | 1 |
| 1,2,3-Trimethyl Benzene | NA | 0.5 |
| Naphthalene | 0.001–0.03 | 0.5 |
| Naphtha Solvent Blend | NA | 40 |

In a typical permeation experiment, three steps are involved. They are (a) the instrument sensitivity calibration, (b) film testing to measure transmission and diffusion rates, and (c) the quality control of the permeation experiment.

Film samples are tested in a closed-volume permeation device. High-resolution gas chromatograph (HRGC) operated with a flame ionization detector (FID) is used to measure the change in the cumulative penetrant concentration as a function of time.

Sample-side and environment-side test compound concentrations are calculated from each compound's response factor or calibration curve. Concentrations are then volume-corrected for each specific set of permeation cells if permeant mass is desired.

The cumulative penetrant concentration is plotted as a function of time on both the upstream (environment) and downstream (sample) side of the film. The diffusion rate and transmission rate of the permeant are calculated from the permeation curve data.

1.0 Equipment and Reagents
  2.1 Equipment

Gas chromatograph (HP 5880) equipped with flame ionization detector, a six-port heated sampling valve with 1 ml sampling loop and data integrator J&W capillary column. DB-5, 30M×0.250 mm ID, 1.0 umdf.

Glass permeation test cells or flasks. Two glass flasks with cavities of approximately 1200 ml (environment cell or feed side) and 300 ml (sample flask or permeating side) the permeation test device useful in determining the permeation of materials through compositions of the invention is shown in Wood et al., U.S. Pat. No. 5,505,969, at Column 16, lines 15–19 and in FIG. 3. Wood et al., U.S. Pat. No. 5,505,696 is incorporated by reference herein with respect to the use of the permeation test device in permeation testing.

Permeation cell clamping rings (2).
  Permeation cell aluminum seal rings (2).
  Natural Rubber Septa. 8 mm OD standard-wall or 9 mm OD (Aldrich Chemical Company, Milwaukee, Wis.).
  Assorted laboratory glass ware and syringes.
  Assorted laboratory supplies.
  2.2 Reagents Reagent water. Water in which interferences are not observed at the MDL of the chemical analytes of interest. A water purification system is used to generate reagent water which has been boiled to 80% volume, capped, and allowed to cool to room temperature before use.

Stock Ethanol/Aromatic Standard solution. Ethanol (0.6030 gram), toluene (0.1722 gram), p-xylene (0.1327 gram), o-xylene (0.0666 gram), trimethylbenzene (0.0375 gram) and naphthalene (0.0400 gram) package in 1 ml sealed glass ampules. Naphtha blends standard is a commercial paint solvent blend containing approximately twenty (20) individual aliphatic hydrocarbon compounds obtained from Sunnyside Corporation, Consumer Products Division, Wheeling, Ill.

Triton X-100. Nonylphenol nonionic surface active agent (Rohm and Hass).
2.0 Standards Preparation
  2.2 Permeation Working Standard A stock permeant test standard solution is used. These standards are prepared by weight from neat certified reference compounds, actual weight and weight percent are shown.

The working ethanol/aromatic standard is prepared by injecting 250 ul of the stock standard solution into 100 ml of reagent water containing 0.1 gram of surfactant (Triton X-100). It is important that the Triton X-100 is completely dissolved in the reagent water prior to adding the permeant stock standard. This will insure dispersing the test compounds in the water. In addition, the working standard should be mixed thoroughly each time an aliquot is dispensed. It is advisable to transfer the working standard to crimp-top vials with no headspace to minimize losses due to the large headspace in the volumetric flask used to prepare the standard.

A working naphtha blend standard is prepared by injecting 800 μL of the "neat" naphtha solvent blend into 100 milliliters of reagent water containing 0.2 gram of surfactant (Triton X-100).

An opened stock standard solution should be transferred from the glass snap-cap vial to a crimp-top vial for short-term storage. The vials may be stored in an explosion-proof refrigerator or freezer.

2.1 Calibration Standards

Calibration standards are prepared at a minimum of three concentration levels by adding volumes of the working standard to a volumetric flask and diluting to volume with reagent water. One of the standards is prepared at a concentration near, but above, the method detection limit. The other concentrations correspond to the expected range of concentrations found in the environment and sample side cells.
3.0 Sample Preparation
  3.1 Film Sample Preparation A permeation test device including an environmental flask and a sample flask, useful in determining the permeation of materials through compositions of the invention in shown in Wood et al., U.S. Pat. No. 5,505,969 at Column 16, lines 15–19 and in FIG. 3 of the patent. Wood et al., U.S. Pat. No. 5,505,969 is incorporated by reference herein with respect to the use of the permeation test device in permeation testing. The environmental flask and sample flask are washed before use in soapy water, thoroughly rinsed with deionized water and oven dried. Following cleaning, each flask is fitted with a rubber septum.

The film test specimen is cut to the inside diameter of the aluminum seal ring of the test device using a template. The film test specimen diameter is important to prevent diffusion losses along cuttages of the circumference. The film sample, aluminum seal in flask or sample is shown in FIG. 3 of the Wood et al. patent, but the clamping ring nuts are not tightened. The test cell is prepared. First the sample flask 32 and environment flask 31 are flushed with dry compressed air to remove humidity in the sample and environment flasks. This is done by puncturing the sample system 33 and environment septum 34 with a needle and tubing assembly which permits a controlled flow of dry air through both flasks simultaneously. The clamp rings 35 are loosely fitted to the flasks to eliminate pressure buildup on either side of the film 30. After flushing both flasks for approximately 10 minutes, the needles are removed and the clamp rings tightened, sealing the film 30 between the two flasks. Rubber faced aluminum spacers 36a, 36b are used to ensure a gas tight fit.

The sample side is injected with 2 μL of water per 300 ml flask volume. Since the sample flasks vary in volume, the water is varied to correspond to the volume variations. The 2 μL of water in the 300 ml flask volume is comparable to a 0.25 water activity product at 72° F. Next, 40 μL, the permeation ethanol/aromatic working standard or 40 μL of the naphtha blend working standard prepared according to section 2.2, is injected into the environmental flask. Either of these working standards will produce a 60% relative humidity at 72° F. with a permeant concentration (parts per million-volume/volume) in the 1200 ml volume flask indicated in Table I. Other humidities or permeant concentrations may be employed in the test method by using psychrometric chart to determine humidity and using the gas loss to calculate permeant concentration. The time is recorded and the permeation cell placed into a thermostatically controlled oven. Samples may be staggered to accommodate GC run time. Three identical permeation devices are prepared. Triplicate analyses are used for QC purposes.

At the end of each time interval, a sample from the group is removed from the oven. The environmental flask is analyzed first, using a heated six-port sampling valve fitted with a 1 ml loop. The loop is flushed with a 1 ml volume of the environment-side or sample-side air. The loop is injected onto the capillary column. The GC/FID system is started manually following the injection. Up to eight 1 ml sample injections may be taken from the sample and environment side of a single permeation experiment.

Sample side and environment side test compound concentrations are calculated from each compound's calibration curve or response factor (equation 1 or 3). Concentrations are then volume-corrected for each specific set of permeation flasks if permeant mass is desired.

4.0 Sample Analysis 4.1 Instrument Parameters

Standards and samples are analyzed by gas chromatography using the following method parameters:

Column: J&W column, DB-5, 30 M, 0.25 mm ID, 1 umdf
Carrier: Hydrogen
Split Vent: 9.4 ml/min
Injection Port Temp: 105° C.
Flame Detector Temp: 200° C.
Oven Temp 1: 75° C.
Program Rate 1: 15° C.
Oven Temp 2: 125° C.
Rate 2: 20° C.
Final Oven Temp: 200° C.
Final Hold Time: 2 Min The six-port sampling valve temperature is set to 105° C.

4.2 Calibration

A three point calibration is prepared using standards in the range of the following test compounds:

| Test Compounds | Calibration Curve Range ppm (μL) |
|---|---|
| Ethanol | 2–20 |
| Toluene | 0.3–3 |
| p-Xylene | 0.2–2 |
| o-Xylene | 0.1–1 |
| 1,2,4-Trimethyl Benzene | 0.05–0.5 |
| Naphthalene | 0.05–0.5 |
| Naphtha Solvent Blend | 4.0–40 |

To prepare a calibration standard, add an appropriate volume of the working standard solution to an aliquot of reagent water in a volumetric flask.

4.2.1 Secondary Dilutions of Working Standard for Calibration Curve 5 to 1 dilution: Place 5 ml of working standard into a 25-ml volumetric flask, stopper, then mix by inverting flask.

2.5 to 1 dilution: Place 10 ml of working standard into a 25-ml volumetric flask, stopper, then mix by inverting flask.

Analyze each calibration standard and tabulate compound peak area response versus the concentration of the test compound in the environment side cell. The results are used to prepare a calibration curve for each compound. The naphtha solvent blend is a commercial paint solvent containing approximately twenty (20) individual aliphatic hydrocarbon compounds. The response versus concentration is determined by totaling the area under each of the twenty individual peaks. Method of least squares is used to fit a straight line to the calibration curve. The slope of each test compound's calibration curve is then calculated for determining the unknown concentration. The average response factor may be used in place of the calibration curve.

The working calibration curve or response factor must be verified on each working day by measurement of one or more calibration standards. If the response of any compound varies more than 20%, the test must be repeated using a fresh calibration standard. If the results still do not agree, generate a new calibration curve.

4.3 Analysis of Calibration Curve and Method Detection Level Samples

Recommended chromatographic conditions are summarized above.

Calibrate the system daily as described above.

Check and adjust split vent rate and check rate with soap film flow meter.

To generate accurate data, samples, calibration standards and method detection level samples must be analyzed under identical conditions.

Calibration standards and method detection samples are prepared in the environment flask only. This is accomplished by using a ½ inch plastic disk and aluminum sheet disk the diameter of the environment flange in place of the sample flask. A single sealing ring is placed onto the environmental glass flange followed by an aluminum sheet, and then the plastic disk.

The environment flask is flushed with dry compressed air to remove humidity in the sample and environment flask. This is done by puncturing the environment septa with a needle and tubing assembly which permits a controlled flow of dry air through the flask. The clamp rings are loosely fitted to the flask to eliminate pressure buildup. After flushing both flasks for approximately 10 minutes, the needle is removed and the clamp rings tightened, sealing the aluminum sheet against the seal ring.

Next, 40 μl of the permeation ethanol/aromatic working standard or secondary dilutions of the working standard is injected into the environment flask. Alternatively, 40 μL of the naphtha solvent blend or secondary dilutions of the working standard is injected into the environmental flask. The time is recorded and the flask is placed into a thermostatically controlled oven.

At the end of 30 minutes, the environment flask is removed from the oven. The environmental flask is analyzed using a heated six-port sampling valve fitted with a 1 ml loop. The loop is flushed with a 1 ml volume of the environment-side or sample-side air. The loop is injected onto the capillary column. The GC/FID system is started manually following the injection.

4.4 Calculation of Results 4.4.1 Test Compound Response Factor

Sample-side and environment-side test compound concentrations are calculated for each compound's calibration curve slope or response factor (RF). Concentrations are then volume-corrected for each specific set of permeation cells if permeant mass is desired.

$$\text{Concentration of Compound in ppm} = \frac{\text{Peak Area}}{\text{Calibration Curve Slope}} \quad (1)$$

$$\text{Compound Specific } RF = \frac{\text{Concentration of Compound in ppm}}{\text{Peak Area}} \quad (2)$$

$$\text{Concentration of Compound in ppm} = \text{Peak Area} \times RF \quad (3)$$

The cumulative penetrant mass is plotted as a function of time on both the upstream (environment) and downstream (sample) side of the film. The diffusion rate and transmission rate of the permeant area calculated from the transmission curve data.

4.4.2 Transmission Rate

When a permeant does not interact with the polymer, the permeability coefficient, R, is usually characteristic for the permeant-polymer system. This is the case with the permeation of many gases, such as hydrogen, nitrogen, oxygen, and carbon dioxide, through many polymers. If a permeant interacts with polymer molecules, as is the case with the permeant test compounds used in this method, P is no longer constant and may depend on the pressure, film thickness, and other conditions. In such cases, a single value of P does not represent the characteristic permeability of the polymer membrane and it is necessary to know the dependency of P on all possible variables in order to obtain the complete profile of the permeability of the polymer. In these cases, the transmission rate, Q, is often used for practical purposes, when the saturated vapor pressure of the permeant at a specified temperature is applied across the film. Permeability of films to water and organic compounds is often expressed this way.

$$P = \frac{(\text{Amount of Permeant})(\text{Film Thickness})}{(\text{Area})(\text{Time})(\text{Pressure-drop Across the Film})} \quad (4)$$

$$Q = \frac{(\text{Amount of Permeant})(\text{Film Thickness})}{(\text{Area})(\text{Time})} \quad (5)$$

In this application, Q is represented in units of $$\frac{\text{gm-0.001 inches}}{100 \text{ in}^2\text{-day}}.$$

One of the major variables in determining the permeation coefficient is the pressure drop across the film. Since the transmission rate Q includes neither pressure nor concentration of the permeant in its dimensions, it is necessary to know either vapor pressure or the concentration of permeant under the conditions of the measurement in order to correlate Q to P.

The pressure-drop across the film from environment side to sample side is principally due to water vapor pressure. The water concentration or humidity does not remain constant and is not measured during the time intervals the organic compounds are analyzed, and therefore the pressure across the membrane is not determined.

The above examples of thermoplastic films containing a variety of compatible cyclodextrin derivatives shows that the invention can be embodied in a variety of different thermoplastic films. Further, a variety of different compatible derivatized cyclodextrin materials can be used in the invention. Lastly, the films can be manufactured using a variety of film manufacturing techniques including extrusion and aqueous dispersion coating to produce useful barriers.

The above specification, examples of substituted cyclodextrin, extruded thermoplastic film cellulosic web laminates and coated cellulosic web laminates and test data provide a basis for understanding the technical aspects of the invention. Since the invention can be made with a variety of embodiments, the invention resides in the claims hereinafter appended.

We claim:

1. A nonwoven cellulosic fiber web, having improved barrier or trap properties in the presence of a permeant or contaminant, the web comprising:
   (a) a layer comprising an continuous array of randomly oriented cellulosic fiber; and
   (b) a layer comprising a effective permeant absorbing amount of a cyclodextrin compound;
wherein the cyclodextrin compound is substantially free of an inclusion complex compound and can act as a barrier to the passage of a permeant from the ambient environment or act as a trap of a contaminant arising from the web.

2. The web of claim 1 wherein the cyclodextrin compound comprises a cyclodextrin compound having at least one pendent moiety or substituent that render the cyclodextrin compatible with the web.

3. The web of claim 2 wherein the cyclodextrin compound contains at least one substituent on a cyclodextrin primary carbon atom.

4. The web of claim 1 wherein the cyclodextrin comprises alpha-cyclodextrin, beta-cyclodextrin, gamma-cyclodextrin or mixtures thereof.

5. The web of claim 2 wherein the cyclodextrin comprises an alpha-cyclodextrin, a beta-cyclodextrin, a gamma-cyclodextrin or mixtures thereof.

6. The web of claim 1 wherein the layer comprises about 0.01 to 10 wt % of the cyclodextrin.

7. The web of claim 1 wherein the layer comprising the cyclodextrin compound is a coating layer.

8. The web of claim 1 wherein the layer comprising the cyclodextrin compound is a laminate film layer.

9. The web of claim 1 wherein the cyclodextrin is an acylated cyclodextrin compound.

10. A non-woven cellulosic fiber web, having improved barrier or trap properties in the presence of a permeant, the web comprising a laminate comprising:

(a) a first layer comprising a continuous array, having a thickness of greater than 0.1 mm, of randomly oriented cellulosic fiber; and (b) a second film layer comprising a thermoplastic film forming polymer and an effective permeant absorbing amount of a modified cyclodextrin compound;

wherein the modified cyclodextrin compound has substituents rendering the compound compatible in a thermoplastic polymer, is substantially free of an inclusion complex compound and can act as a barrier to the passage of a permeant from the ambient environment or act as a trap of a permeant arising from the web.

11. The web of claim 10 wherein the laminate comprises a flexible laminate.

12. The web of claim 10 wherein the modified cyclodextrin compound comprises an acetylated cyclodextrin compound.

13. The web of claim 10 wherein the modified cyclodextrin compound comprises a cyclodextrin having a silicone substituent.

14. The web of claim 10 wherein the cyclodextrin in present in the second layer at a concentration of about 0.1 to 10 wt-% based on the thermoplastic film forming polymer.

15. The web of claim 10 wherein the thermoplastic film forming polymer comprises a homopolymer comprising ethylene.

16. The web of claim 15 wherein the polymer comprising ethylene comprises a copolymer.

17. The web of claim 10 wherein the thermoplastic film forming polymer comprises a polymer comprising vinyl chloride.

18. A non-woven web comprising a cellulosic fiber, having improved barrier or trap properties in the presence of a permeant, the web comprising:

(a) a layer comprising a continuous array of randomly oriented cellulosic fiber; and (b) a flexible coating comprising a film forming polymer and an effective permeant absorbing amount of a cyclodextrin compound;

wherein the cyclodextrin compound is substantially free of an inclusion complex compound and can act as a barrier to the passage of a permeant from the ambient environment or act as a trap of a permeant arising from the web.

19. The web of claim 18 wherein the modified cyclodextrin compound comprises an acetylated cyclodextrin compound.

20. The web of claim 18 wherein the modified cyclodextrin compound comprises a cyclodextrin having a silicone substituent.

21. The web of claim 18 wherein the cyclodextrin in present in the second layer at a concentration of about 0.1 to 10 wt-% based on the thermoplastic film forming polymer.

22. The web of claim 18 wherein the thermoplastic film forming polymer comprises a polymer comprising ethylene.

23. The web of claim 22 wherein the polymer comprising ethylene comprises a copolymer comprising ethylene.

24. The web of claim 18 wherein the thermoplastic film forming polymer comprises a polymer comprising vinyl chloride.

25. The web of claim 1 wherein the layer comprising a continuous array of randomly oriented cellulosic fiber also comprises an effective permeant absorbing amount of a cyclodextrin compound.

26. The web of claim 25 wherein the cyclodextrin compound acts as a trap for a permeant arising from the web.

27. The web of claim 10 wherein the second layer comprises a thermoplastic film and a flexible coating comprising a film forming polymer.

28. The web of claim 27 wherein the thermoplastic film comprises an effective permeant absorbing amount of a cyclodextrin compound.

29. The web of claim 10 wherein the laminate further comprises a third layer comprising a thermoplastic film comprising a vinyl polymer.

30. The web of claim 29 wherein the second film layer is positioned between the first layer and the third layer.

31. The web of claim 30 wherein the third layer comprises a polyethylene film.

32. The web of claim 30 wherein the third layer comprises an ethylene copolymer film.

33. The web of claim 30 wherein the second layer comprises a polymer film comprising repeating units of vinyl chloride.

34. The web of claim 18 wherein the flexible coating comprising a film forming polymer comprises an acrylic polymer.

35. Non-woven cellulosic fiber web, having improved barrier or trap properties in the presence of a permeant or contaminant, the web comprising:

(a) a layer comprising a continuous array of randomly oriented cellulosic fiber and an effective permeant absorbing amount of a cyclodextrin compound; and (b) a second layer comprising a thermoplastic film, a coating, a continuous array of a randomly oriented cellulosic fiber or a layer comprising printing;

wherein the cyclodextrin compound is substantially free of an inclusion complex compound and can act as a barrier to the passage of a permeant from the ambient environment or act as a trap of a contaminant arising from the web.

36. The web of claim 35 wherein the cyclodextrin compound comprises a modified cyclodextrin compound having at least one pendent moiety or substituent that renders the cyclodextrin compatible with the web.

37. The web of claim 35 wherein the cyclodextrin comprises alpha-cyclodextrin, beta-cyclodextrin, gamma-cyclodextrin or mixtures thereof.

38. The web of claim 35 wherein the layer comprises about 0.01 to 10 wt % of the cyclodextrin.

39. The web of claim 35 wherein the cyclodextrin is an acyl modified cyclodextrin.

40. The web of claim 35 wherein the layer comprising a continuous array of randomly oriented cellulosic fiber comprises two or more distinct layers of cellulosic fiber.

* * * * *